United States Patent
Artz et al.

(10) Patent No.: US 10,990,352 B1
(45) Date of Patent: Apr. 27, 2021

(54) SYSTEMS AND METHODS FOR DATA STRUCTURE STORAGE AND COMBINATION BASED ON DATA STRUCTURE CONTENT

(71) Applicant: Optum, Inc., Minnetonka, MN (US)

(72) Inventors: Margaret B. Artz, Minneapolis, MN (US); Bob Martin, Chandler, AZ (US)

(73) Assignee: Optum, Inc., Minnetonka, MN (US)

( * ) Notice: Subject to any disclaimer, the term of this patent is extended or adjusted under 35 U.S.C. 154(b) by 352 days.

(21) Appl. No.: 16/036,648

(22) Filed: Jul. 16, 2018

Related U.S. Application Data

(60) Provisional application No. 62/668,389, filed on May 8, 2018.

(51) Int. Cl.
*G06F 16/00* (2019.01)
*G06F 7/14* (2006.01)
*G06F 16/248* (2019.01)
*G06F 16/22* (2019.01)
*G06F 16/2458* (2019.01)
*G06F 16/2457* (2019.01)
*G06F 16/215* (2019.01)

(52) U.S. Cl.
CPC .............. *G06F 7/14* (2013.01); *G06F 16/215* (2019.01); *G06F 16/2228* (2019.01); *G06F 16/248* (2019.01); *G06F 16/2477* (2019.01); *G06F 16/24578* (2019.01)

(58) Field of Classification Search
CPC ...... G06F 7/14; G06F 16/2228; G06F 16/248; G06F 16/2477; G06F 16/24578
See application file for complete search history.

(56) References Cited

U.S. PATENT DOCUMENTS

| | | |
|---|---|---|
| 2005/0197545 A1 | 9/2005 | Hoggle |
| 2008/0312966 A1 | 12/2008 | Meshginpoosh |
| 2014/0156298 A1 | 6/2014 | Crawford et al. |
| 2017/0011176 A1 | 1/2017 | Galley et al. |

OTHER PUBLICATIONS

Libby, Anne M., et al., Medication Regimen Complexity Study, Sep 26, 2012, MedCom Skaggs Symposium, 26 pages, http://www.ucdenver.edu/academics/colleges/pharmacy/Research/researchareas/Documents/POR/MedCom_Skaggs_Symposium_2012Sept26_1300.pdf, Dec. 17, 2018.

(Continued)

*Primary Examiner* — Tyler J Torgrimson
(74) *Attorney, Agent, or Firm* — Alston & Bird LLP

(57) ABSTRACT

Generating a data structure based on time-series data stored within a data store comprises: generating a plurality of time frame nodes within a data structure having a member node associated with a particular member, each time frame node reflecting a particular period of time during which there are no changes to the content of drug nodes associated with the particular period of time. At least a portion of those drug nodes at least partially reflect merged data records reflecting the combined duration of a plurality of matching data records, wherein the duration of the merged data records are determined based at least in part on characteristic data stored within one or more of the identified matching data records. The time frame nodes of the data structure are generated based on determined changes in content of the drug nodes based on the merged data records.

27 Claims, 14 Drawing Sheets

(56) References Cited

OTHER PUBLICATIONS

Libby, A. M., et al., "Patient-Level Medication Regimen Complexity Across Populations With Chronic Disease", Apr. 1, 2013, Clinical Therapeutics, pp. 386-398.e1, vol. 35, No. 4, https://www.clinicaltherapeutics.com/article/50149-2918(13)00075-1/fulltext, Dec. 17, 2018.

Johnson et al., "Development and Validation of the Medication Regimen Complexity Index." (published online Jun. 20, 2004), Sage Journals=The Annals of Pharmacotherapy, Sep. 1, 2004, The Annals of Pharmacotherapy, pp. 1369-1376, vol. 38, https://www.researchgate.net/publication/8443648_Development_and_Validation_of_the_Medication_Regimen_Complexity_Index/download, Dec. 17, 2018.

Complexity Output

| Memb erID | Age | Gen | Start Date | End Date | Drug Ther ID | Num GCN | Num DCC | Num Mult | Num Orph | Wt Tot | Wt Dose Form | Wt Dose Freq | Wt Aux | Wt Mult | Error | |
|---|---|---|---|---|---|---|---|---|---|---|---|---|---|---|---|---|
| 1 | 52 | M | 1/12/2018 | 2/10/2018 | 0 | 4 | 4 | 2 | 0 | 14 | 1 | 7 | 4 | 2 | 0 | ⎫ Date range 1 |
| 1 | 52 | M | 1/12/2018 | 2/10/2018 | 28 | 1 | 1 | 0 | 0 | 2 | 1 | 1 | 0 | 0 | 0 | |
| 1 | 52 | M | 1/12/2018 | 2/10/2018 | 44 | 1 | 1 | 1 | 0 | 8 | 1 | 4 | 2 | 1 | 0 | |
| 1 | 52 | M | 1/12/2018 | 2/10/2018 | 9999 | 2 | 2 | 1 | 0 | 6 | 1 | 2 | 2 | 1 | 0 | |
| 1 | 52 | M | 2/11/2018 | 4/6/2018 | 0 | 1 | 1 | 1 | 0 | 8 | 1 | 4 | 2 | 1 | 0 | ⎫ Date range 2 |
| 1 | 52 | M | 2/11/2018 | 4/6/2018 | 44 | 1 | 1 | 1 | 0 | 8 | 1 | 4 | 2 | 1 | 0 | |
| 1 | 52 | M | 4/7/2018 | 5/6/2018 | 0 | 3 | 3 | 2 | 0 | 13 | 1 | 6 | 4 | 2 | 0 | ⎫ Date range 3 |
| 1 | 52 | M | 4/7/2018 | 5/6/2018 | 44 | 1 | 1 | 1 | 0 | 8 | 1 | 4 | 2 | 1 | 0 | |
| 1 | 52 | M | 4/7/2018 | 5/6/2018 | 9999 | 2 | 2 | 1 | 0 | 6 | 1 | 2 | 2 | 1 | 0 | |
| 1 | 52 | M | 6/7/2018 | 6/18/2018 | 0 | 1 | 1 | 1 | 0 | 8 | 1 | 4 | 2 | 1 | 0 | ⎫ Date range 4 |
| 1 | 52 | M | 6/7/2018 | 6/18/2018 | 44 | 1 | 1 | 1 | 0 | 8 | 1 | 4 | 2 | 1 | 0 | |
| 1 | 53 | M | 6/19/2018 | 7/17/2018 | 0 | 3 | 3 | 2 | 0 | 13 | 1 | 6 | 4 | 2 | 0 | ⎫ Date range 5 |
| 1 | 53 | M | 6/19/2018 | 7/17/2018 | 44 | 1 | 1 | 1 | 0 | 8 | 1 | 4 | 2 | 1 | 0 | |
| 1 | 53 | M | 6/19/2018 | 7/17/2018 | 9999 | 2 | 2 | 1 | 0 | 6 | 1 | 2 | 2 | 1 | 0 | |

FIG. 8

Josephine Jones
DOB: 04251944
REGIMEN DATE: 4/2/20XX

| Total Complexity Score 24 | | | Weight contributions for each criteria | | |
|---|---|---|---|---|---|
| | Unique Drugs | Dose Freq | Multiple Units/Dose | Route-Dosage Form | Auxiliary Instructions |
| | 6* | 10* | 3 | 6 | 5 |

| Total Complexity Score by Drug Therapy Area | | Dose Freq | Multiple Units/Dose | Route-Dosage Form | Auxiliary Instructions |
|---|---|---|---|---|---|
| Diabetes = 12 | 3 | 5 | 1 | 4 | 2 |
| Hyperlipidemia = 2 | 1 | 1 | 0 | 0 | 1 |
| Asthma = 10 | 2 | 4 | 2 | 2 | 2 |
| Hypertension = 1 | 1 | 1 | 0 | 0 | 0 |

FIG. 9

SYSTEMS AND METHODS FOR DATA STRUCTURE STORAGE AND COMBINATION BASED ON DATA STRUCTURE CONTENT

CROSS-REFERENCE TO RELATED APPLICATIONS

This patent application claims priority from Provisional Patent Appl. Ser. No. 62/668,389, filed May 8, 2018, which is incorporated herein by reference in its entirety.

BACKGROUND

Without underlying metadata that is associated with various data structures when those data structures are first created, existing storage databases lack resource efficient mechanisms for reorganizing, merging, or otherwise consolidating data structures stored therein. Because an ever-increasing number of data creating devices are utilized on a daily basis, a need constantly exists for new, resource-efficient systems and methods for merging data structures stored within storage databases.

BRIEF SUMMARY

Various embodiments are directed to systems and methods for merging data records (e.g., time-based data records) based on characteristic data stored within those data records to generate merged data records representative of the combined data records, and to compile data structures based on those merged data records that may be utilized to generate summary reports based on those data structures. In certain embodiments, each of those data records may be associated with a particular size, a particular quantity, a particular duration, and/or the like. Similarly, the merged data records may have associated size, quantity, and/or duration characteristics determined based on the substantive content of the data records, however the merged data records to have repeatably-determined size, quantity, and/or duration characteristics that are not identifiable based on the corresponding size, quantity, and/or duration characteristics of the combined data records alone. Such configurations may be particularly usable for building a prescription data structure for a particular member, which is indicative of the combination of prescriptions prescribed to the member during particular time periods, while considering changes in dosage, changes in frequency of dosage, and/or the like. The prescription data structure may then be utilized to generate a complexity score for the member at a particular time, wherein the complexity score provides an objective measure of the difficulty associated with adherence to a prescribed prescription schedule for the member.

Certain embodiments are directed to a computer-implemented method for automatically combining time-series based data records stored within a data store. The method may comprise: identifying a plurality of matching data records within the data store based at least in part on characteristics of each of the plurality of matching data records, wherein the matching data records have differing initiation dates; generating a plurality of merged data records for the identified plurality of matching data records, wherein each of the plurality of merged data records comprise corresponding pluralities of matching data records; determining a time-series duration for each of the plurality of merged data records based at least in part on the characteristics of the corresponding plurality of matching data records by: determining time periods of each of the plurality of matching data records associated with a merged data record based at least in part on the characteristics and the initiation date of each of the plurality of matching data records; identifying a time overlap or time gap between the plurality of matching data records; and determining the time-series duration for each of the plurality of merged data records based on the time period of each of the plurality of matching data records and the time overlap or the time gap between the plurality of matching data records; generating a data structure comprising a plurality of time frame nodes and a plurality of drug nodes, wherein the time frame nodes are associated with time frames identified based at least in part on the time-series duration for the plurality of merged data records and one or more drug nodes are associated with matching data records.

In certain embodiments, the characteristics for each of the plurality of matching data records comprise frequency data indicative of a usage frequency associated with each of the plurality of matching data records; and wherein determining a time-series duration for merged data records further comprises: determining whether frequency data differs between the plurality of matching data records; upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records. Moreover, the method may further comprise steps for: retrieving characteristic data mapped to one or more of the characteristics of at least one of the plurality of matching data records from one or more additional data stores; generating a summary score for the merged data record based at least in part on the characteristic data, wherein the summary score is applicable during the time-series duration of the merged data record; and generating a graphical output indicative of the summary score for the merged data record. In certain embodiments, generating a summary score comprises steps for generating a flat data file comprising summary score data for the merged data record. Moreover, the method may further comprise steps for: receiving a flat input data file identifying one or more reviewed characteristics and one or more time periods for analysis, and wherein the identified matching data records satisfy the reviewed characteristics and have an associated time-series duration overlapping the time periods for analysis.

In certain embodiments, identifying a plurality of matching data records comprises identifying a plurality of data records having matching drug identifiers and member identifiers. Moreover, the characteristics for each of the plurality of matching data records may comprise dosage frequency data indicative of a frequency for taking dosages of a given number of units of the drug associated with each of the plurality of matching data records; and wherein determining a time-series duration for the merged data record further comprises: determining whether the dosage frequency data differs between the plurality of matching data records; upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records. Moreover, the method may further comprise steps for associating a plurality of matching data records with a drug therapy; and wherein the data structure further comprises drug therapy nodes associated with the drug therapy and one or more of the drug nodes are associated with the drug therapy nodes.

In certain embodiments, building time frame nodes comprises: identifying a first initiation date of a first merged data record; and identifying a temporally next record event selected from a second initiation date of a second merged data record or a termination date of the first merged data record such that a time period between the first initiation date and the temporally next record event reflects a consistent combination of merged data records; and building a first time frame node associated with the date range between the first initiation date and the temporally next record event; and wherein drug nodes associated with the first time frame node reflect at least one merged data record overlapping the date range between the first initiation date and the temporally next record event.

Various embodiments are directed to a system for automatically combining time-series based data records stored within a data store. In certain embodiments, the system comprises: one or more memory storage areas comprising a data store; and one or more processors collectively configured to: identify a plurality of matching data records within the data store based at least in part on characteristics of each of the plurality of matching data records, wherein the matching data records have differing initiation dates; generate a plurality of merged data records for the identified plurality of matching data records, wherein each of the plurality of merged data records comprise corresponding pluralities of matching data records; determine a time-series duration for each of the plurality of merged data records based at least in part on the characteristics of the corresponding plurality of matching data records by: determining time periods of each of the plurality of matching data records associated with a merged data record based at least in part on the characteristics and the initiation date of each of the plurality of matching data records; identifying a time overlap or time gap between the plurality of matching data records; and determining the time-series duration for each of the plurality of merged data records based on the time period of each of the plurality of matching data records and the time overlap or the time gap between the plurality of matching data records; generate a data structure comprising a plurality of time frame nodes and a plurality of drug nodes, wherein the time frame nodes are associated with time frames identified based at least in part on the time-series duration for the plurality of merged data records and one or more drug nodes are associated with matching data records.

In various embodiments, the characteristics for each of the plurality of matching data records comprises frequency data indicative of a usage frequency associated with each of the plurality of matching data records; and wherein determining a time-series duration for merged data records further comprises: determining whether frequency data differs between the plurality of matching data records; upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records. In certain embodiments, the processors may be further configured to: retrieve characteristic data mapped to one or more of the characteristics of at least one of the plurality of matching data records from one or more additional data stores; generate a summary score for the merged data record based at least in part on the characteristic data, wherein the summary score is applicable during the time-series duration of the merged data record; and generate a graphical output indicative of the summary score for the merged data record. In various embodiments, generating a summary score comprises steps for generating a flat data file comprising summary score data for the merged data record. Moreover, the one or more processors may be further configured to receive a flat input data file identifying one or more reviewed characteristics and one or more time periods for analysis, and wherein the identified matching data records satisfy the reviewed characteristics and have an associated time-series duration overlapping the time periods for analysis. In various embodiments, identifying a plurality of matching data records comprises identifying a plurality of data records having matching drug identifiers and member identifiers. Moreover, the characteristics for each of the plurality of matching data records may comprise dosage frequency data indicative of a frequency for taking dosages of a given number of units of the drug associated with each of the plurality of matching data records; and wherein determining a time-series duration for the merged data record further comprises: determining whether the dosage frequency data differs between the plurality of matching data records; upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records.

In certain embodiments, the one or more processors are further configured for associating a plurality of matching data records with a drug therapy; and wherein the data structure further comprises drug therapy nodes associated with the drug therapy and one or more of the drug nodes are associated with the drug therapy nodes. In certain embodiments, building time frame nodes comprises: identifying a first initiation date of a first merged data record; and identifying a temporally next record event selected from a second initiation date of a second merged data record or a termination date of the first merged data record such that a time period between the first initiation date and the temporally next record event reflects a consistent combination of merged data records; and building a first time frame node associated with the date range between the first initiation date and the temporally next record event; and wherein drug nodes associated with the first time frame node reflect at least one merged data record overlapping the date range between the first initiation date and the temporally next record event.

Various embodiment are directed to a computer program product comprising a non-transitory computer readable medium having computer program instructions stored therein, the computer program instructions when executed by a processor, cause the processor to: identify a plurality of matching data records within the data store based at least in part on characteristics of each of the plurality of matching data records, wherein the matching data records have differing initiation dates; generate a plurality of merged data records for the identified plurality of matching data records, wherein each of the plurality of merged data records comprise corresponding pluralities of matching data records; determine a time-series duration for each of the plurality of merged data records based at least in part on the characteristics of the corresponding plurality of matching data records by: determine time periods of each of the plurality of matching data records associated with a merged data record based at least in part on the characteristics and the initiation date of each of the plurality of matching data records; identify a time overlap or time gap between the plurality of matching data records; and determine the time-series duration for each of the plurality of merged data records based on the time period of each of the plurality of matching data records and the time overlap or the time gap between the plurality of matching data records; generate a data structure comprising a plurality of time frame nodes and a plurality of drug nodes, wherein the time frame nodes are associated with time frames identified based at least in part on the time-series duration for the plurality of merged data records and one or more drug nodes are associated with matching data records.

In certain embodiments, the characteristics for each of the plurality of matching data records comprises frequency data indicative of a usage frequency associated with each of the plurality of matching data records; and wherein determining a time-series duration for merged data records further comprises: determining whether frequency data differs between the plurality of matching data records; upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records. Moreover, the computer program product may be further configured to cause the processor to retrieve characteristic data mapped to one or more of the characteristics of at least one of the plurality of matching data records from one or more additional data stores; generate a summary score for the merged data record based at least in part on the characteristic data, wherein the summary score is applicable during the time-series duration of the merged data record; and generate a graphical output indicative of the summary score for the merged data record.

In certain embodiments, generating a summary score comprises steps for generating a flat data file comprising summary score data for the merged data record. Moreover, the computer program product may be further configured to cause the processor to receive a flat input data file identifying one or more reviewed characteristics and one or more time periods for analysis, and wherein the identified matching data records satisfy the reviewed characteristics and have an associated time-series duration overlapping the time periods for analysis. In certain embodiments, identifying a plurality of matching data records comprises identifying a plurality of data records having matching drug identifiers and member identifiers. Moreover, the characteristics for each of the plurality of matching data records may comprise dosage frequency data indicative of a frequency for taking dosages of a given number of units of the drug associated with each of the plurality of matching data records; and wherein determining a time-series duration for the merged data record further comprises: determining whether the dosage frequency data differs between the plurality of matching data records; upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records.

In certain embodiments, the computer program product is further configured to cause the processors to associate a plurality of matching data records with a drug therapy; and wherein the data structure further comprises drug therapy nodes associated with the drug therapy and one or more of the drug nodes are associated with the drug therapy nodes. Moreover, building time frame nodes may comprise: identifying a first initiation date of a first merged data record; and identifying a temporally next record event selected from a second initiation date of a second merged data record or a termination date of the first merged data record such that a time period between the first initiation date and the temporally next record event reflects a consistent combination of merged data records; and building a first time frame node associated with the date range between the first initiation date and the temporally next record event; and wherein drug nodes associated with the first time frame node reflect at least one merged data record overlapping the date range between the first initiation date and the temporally next record event.

BRIEF DESCRIPTION OF THE SEVERAL VIEWS OF THE DRAWINGS

Reference will now be made to the accompanying drawings, which are not necessarily drawn to scale, and wherein:

FIGS. 8-12 are example graphical outputs that may be generated by an analytic computing entity according to various embodiments.

DETAILED DESCRIPTION

Figure 1:
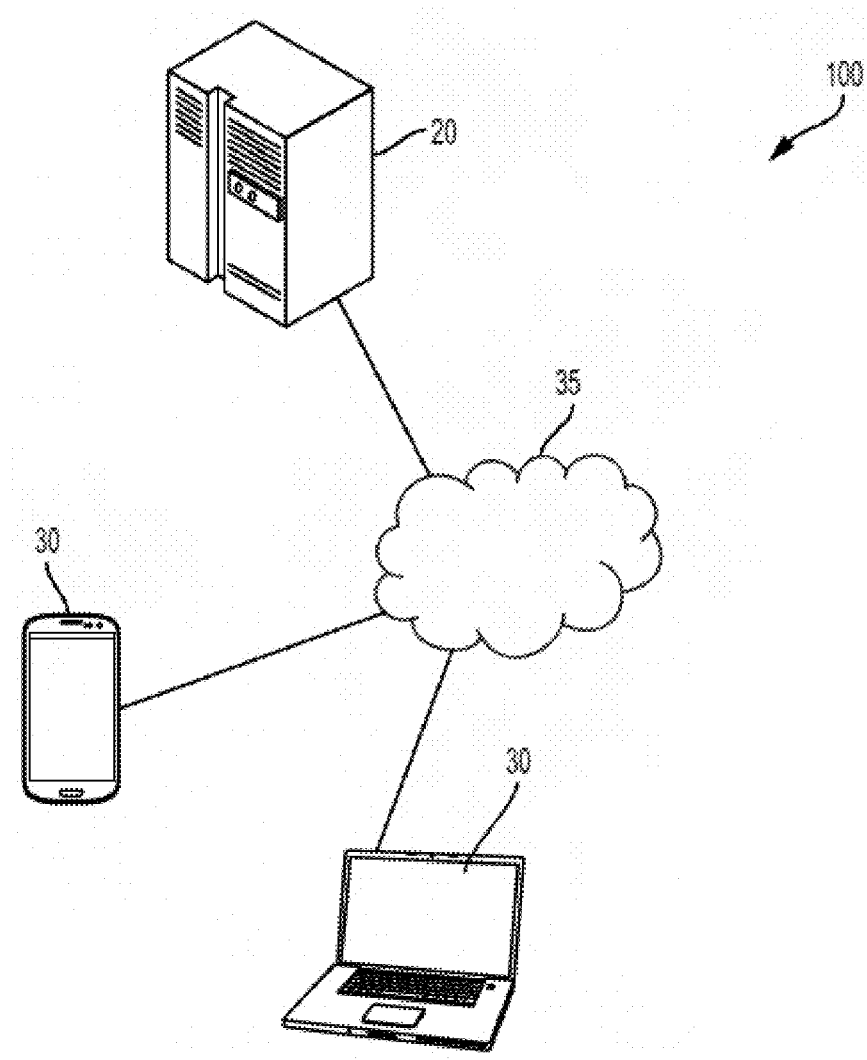
FIG. 1 is a diagram of a system that can be used in conjunction with various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Various embodiments provide particular systems and methods for merging data structures (e.g., time-series based data) based on characteristic data (e.g., indicative of non-temporal aspects of a particular claim) content stored within each of those data structures to provide a merged data record having particular durations and/or characteristics generated based on the substantive data content of those data structures. For example, the resulting merged data structure may have repeatably-determinable durations and/or characteristics that are not simply a sum of the corresponding durations and/or characteristics of the underlying data structures.

As one example, certain embodiments may be provided as an analytic tool for determining a particular healthcare member's prescription complexity, which itself may be utilized to identify members that may benefit from additional member-specific services, such as prescription-adherence counseling, prescription combination reviews (e.g., to determine whether one or more drugs may be eliminated from the member's prescription regimen, and/or the like). The analytic tool may comprise a claims-based mechanism (e.g., a prescription claims-based mechanism) to determine the complexity of a patient's out-patient medication regimen. The analytic tool may utilize routinely collected pharmaceutical claims data as input, and may capture relevant drug information provided during various periods of time to organize the claims data into meaningful complexity scores. The resulting complexity scores may be computed for all medications deemed as active for a particular time period (e.g., day, week, month, and/or the like). The tool may also determine a complexity score for all medications within individual drug therapies, as well as the weights for each of a plurality of defined criteria that are combined (e.g., summed) to produce the complexity scores. For example, the analytic tool may determine prescription complexity scores based at least in part on components of dosing frequency, dosage form and route of administration, auxiliary instructions (e.g., warnings), multiple units per dose instructions for various prescriptions and/or the like. The resulting weighted prescription complexity score is embodied as a single number for a particular member or for a particular drug therapy for the member. By using the claims data as input, the tool may be configured to generate member-level prescription complexity scores for large populations of patients, and for automatically determining these complexity scores for member-specific time frames for each individual member.

The analytic tool may be used alone (e.g., as a stand-alone web-based service, as a cloud-based service, as a locally-stored service, and/or the like) or in conjunction with other member prescription-related tools.

a. Technical Problem to be Solved

Existing electronic data storage and manipulation methodologies are incompatible with the organic complexities of patient medication regimens. Existing methodologies for combining data structures, such as individual data records (e.g., prescription data records) provide rigid, metadata driven mechanisms for combining data structures, and therefore these existing methodologies are incapable of accommodating changes to a particular member's prescription that result in changes to the usage of residual doses from a prior prescription for the member, for example. The deficiencies of existing data structure merging mechanisms result in inaccuracies in determinations of the effective length of various prescriptions, which may create downstream errors in calculations and/or other determinations that rely on accurate data reflecting members' medication usage over time.

b. Technical Solution

Embodiments of the present invention remedy the above technical problems with systems and methods configured for combining data structures—such as time-series based data records associated with individual prescriptions for a particular member—based on the substantive and characteristic content of each of those data structures to determine accurate characteristics of the resulting merged data structure. For example, embodiments of the present invention are configured to accurately combine multiple prescriptions for a common drug (e.g., identified based on non-temporal aspects of the prescription, such as the drug name, drug strength, drug route of administration, and/or the like) while reflecting any changes in prescribed dosages, frequency, and/or the like while also maintaining accurate data regarding the effective length of the prescription based on residual quantities remaining from prior, related prescriptions of the same drug. Moreover, various embodiments are configured for monitoring the member's prescriptions, and therefore the described systems and methodologies may be configured to accurately consider the impacts of the members' delays in filling prescriptions, or overlaps between multiple related prescriptions.

Specifically, various embodiments address the foregoing technical problems utilizing specifically configured data structures that are automatically generated to reflect collections of prescriptions associated with a particular member at particular timeframes. The embodiments are configured for making determinations of prescriptions associated with particular members in a resource-efficient manner, in which automatically generated and member-specific timeframes are generated based at least in part on the identification of time frames during which a patient's combination of prescriptions remains unchanged. Accordingly, calculations of a particular member's prescription complexity need not be completed individually at the lowest level (e.g., smallest unit) of time measured by the system, thereby efficiently utilizing computing resources to determine a member's prescription complexity.

II. Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and/or the like. For example, a user may be an employee of a healthcare organization seeking access to records associated with a particular patient/member, a particular healthcare provider (e.g., physician), a particular healthcare services organization (e.g., a laboratory), and/or the like.

As used herein, the term "member," "beneficiary," "subscriber," and/or "customer" (which may be used interchangeably) may refer to a person who receives healthcare services or products rendered by a provider and who relies on financing from a health insurance payer to cover the costs of the rendered health services or products. In that sense, the member is associated with the health insurance payer and is said to be a member of (a program associated with) of the health insurance payer. Members may be associated with any of a variety of health insurance payers, such as Medicare, Medicaid, and/or private insurance providers. A member may be associated with a "fully insured" plan, an "administrative services only" plan with the employer of the member to provide claims processing services on behalf of the member, and/or the like.

The member may be associated with a "member profile" which comprises information associated with the member, including, for example, a member identifier (e.g., an alphanumeric string uniquely identifying the member, which may be unique to a system provided in accordance with the description herein, or may be provided by another entity, such as a governmental entity (e.g., the user identifier may be a user's social security number)), a member's real name (e.g., John Doe), member contact information (e.g., an email address, a phone number, a mailing address, and/or the like), member residence location information (e.g., a residential address), biologic information (e.g., age, gender, and/or the like), medical information (e.g., known medical conditions, medical history, and/or the like), links to other associated member profiles (e.g., a relative's profile, such as a parent's profile, a spouse's profile, and/or the like), and/or the like.

As used herein, the term "provider" may refer to an entity that provides services or products to members. In at least one embodiment, providers rely on a health insurance payer to finance or reimburse the cost of the services or products provided. For example, a provider may comprise a health professional operating within one or more of a plurality of branches of healthcare, including medicine, surgery, dentistry, midwifery, pharmacy, psychology, psychiatry, pain management, nursing, laboratory diagnostics, and/or the like. A provider may also comprise an organization, such as a private company, hospital, laboratory, or the like, that operates within one or more of a plurality of branches of healthcare.

As used herein, the term "health insurance payer" may refer to entities, other than a patient, that finance or reimburse the cost of health services or products. In the context of the health risk fraud system disclosed herein, the health insurance payer is affiliated/associated with a plurality of providers and members. In some embodiments, the affiliation/association may take the form of enrollment in an insurance plan wherein a health insurance payer agrees to pay at least a portion of certain medical costs incurred by a member in exchange of receiving other payments from the member (e.g., monthly payments and, potentially, a deductible per claim). Similarly, the affiliation/association may take the form of an agreement between a health insurance payer and a provider in which the provider agrees to accept patients covered under an insurance plan supplied by the health insurance payer in exchange of the health insurance payer referring patients to the provider and covering the cost of health services and products rendered by the provider. The person of ordinary skill would recognize that variations of these affiliations/associations are contemplated within this definition, and the affiliations/definitions described in this definition are provided only for illustrative purposes.

A "medication regimen" or "prescription regimen" is indicative of dosing schedules, administration, special instructions, and/or the like involved with the taking of one or more medications. A medication regimen may involve taking more than one drug on a daily basis, and may reflect different medication schedules for different days, in accordance with the respective prescribed dosing schedules for each regimen. A member's medication regimen may involve one or more drug types which may be taken at home (e.g., wherever the patient is located) or administered at defined places of service (e.g., at a particular facility or physician's office). Moreover, medication may be administered in an in-patient setting, where the patient is under the care and/or supervision of medical professionals, or in an out-patient setting, which may require additional oversight of the medication regimen by the patient himself/herself.

The complexity of a particular medication regimen is indicative of the level of difficulty associated with discrete components associated with drug product attributes and/or administration instructions of one or more drugs. As used herein, the complexity of a particular medication regimen is defined in accordance with an objective score. As a general observation, as the complexity of a particular medication regimen increases, the risk of nonadherence to the medication regimen similarly increases. Nonadherence to a prescribed medication regimen increases the risk of poor patient outcomes such as inadequate management of medical conditions, emergency department visits or hospital admissions. The ability to target members with complex medical regimens may help focus additional medication interventions to those patients who may benefit most from drug therapy management services.

The objective complexity score for a particular medication regimen may be determined based on a linear scale (e.g., a Likert scale) wherein a higher complexity score represents a higher level of difficulty associated with a medication regimen. For example, a five-point scale may be utilized for each of a plurality of components of the complexity score, wherein the lowest integer (e.g., one) represents minimal complexity, and the highest integer (e.g., five) represents maximal complexity. Such a scale enables maintains anonymity where desired for particular members.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps, operations, or processes. Thus, embodiments of the present invention may also take the form of an entirely hardware embodiment, an entirely computer program product embodiment, and/or an embodiment that comprises combination of computer program products and hardware performing certain steps, operations, or processes.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps, operations, or processes specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of a system 100 that can be used in conjunction with various embodiments of the present invention. As shown in FIG. 1, the system 100 may comprise one or more analytic computing entities 20, one or more user computing entities 30, one or more networks 35, and/or the like. Each of the components of the system may be in electronic communication with, for example, one another over the same or different wireless or wired networks 35 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Analytic Computing Entity

Figure 2A:
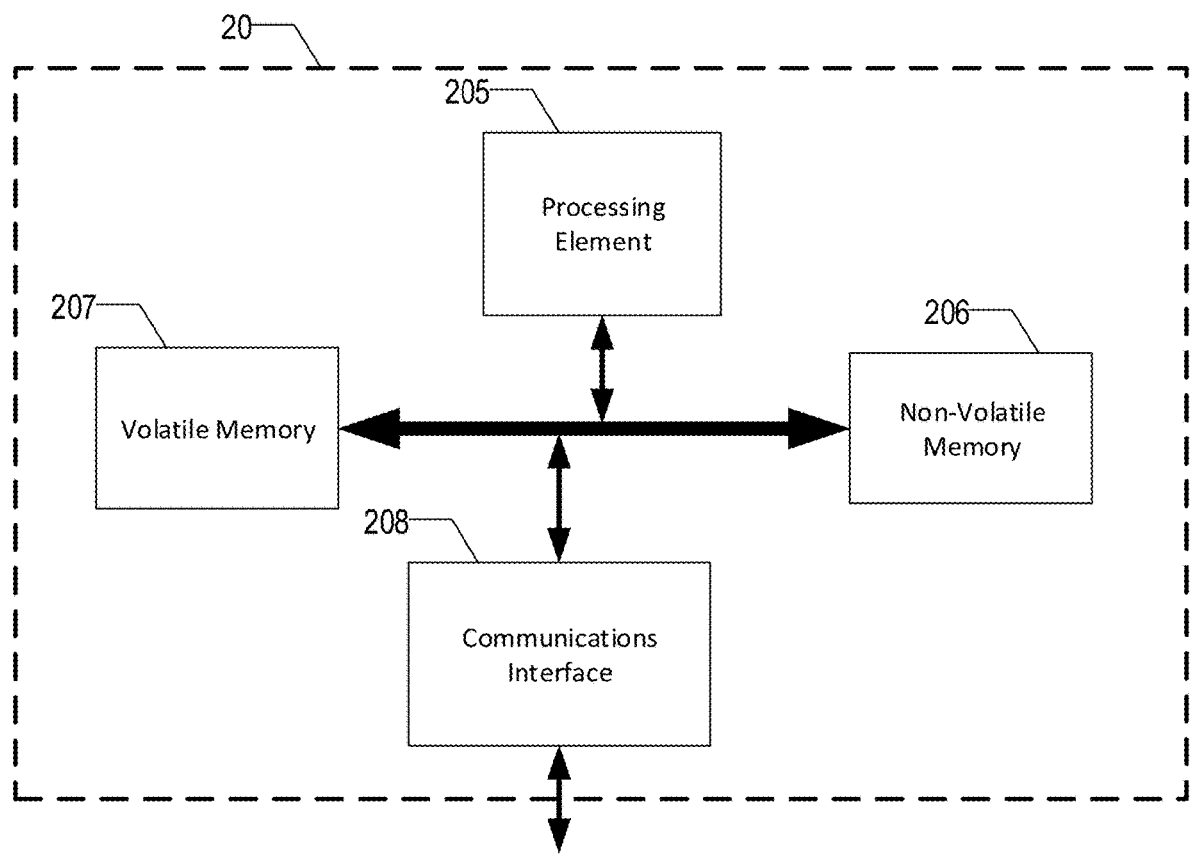
FIGS. 2A-2B are schematics of portions of an analytic computing entity in accordance with certain embodiments of the present invention.

FIG. 2A provides a schematic of an analytic computing entity 20 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the analytic computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 20 may communicate with other computing systems, one or more user computing entities 30, and/or the like.

As shown in FIG. 2A, in one embodiment, the analytic computing entity 20 may include or be in communication with one or more processing elements 205 (also referred to as processors, processing circuitry, and/or similar terms used herein interchangeably) that communicate with other elements within the analytic computing entity 20 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps, operations, or processes according to embodiments of the present invention when configured accordingly.

In one embodiment, the analytic computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that may be stored in a computer-readable storage medium, such as via a relational database, hierarchical database, and/or network database.

Memory media 206 may also be embodied as a data storage device or devices, as a separate database server or servers, or as a combination of data storage devices and separate database servers. Further, in some embodiments, memory media 206 may be embodied as a distributed repository such that some of the stored data may be stored centrally in a location within the system and other data may be stored in one or more remote locations. Alternatively, in some embodiments, the distributed repository may be distributed over a plurality of remote storage locations only. As a person of ordinary skill in the art would recognize, the data required for the operation of the analytic computing entity may also be partially stored in the cloud data storage system and partially stored in a locally maintained data storage system.

Figure 2B:
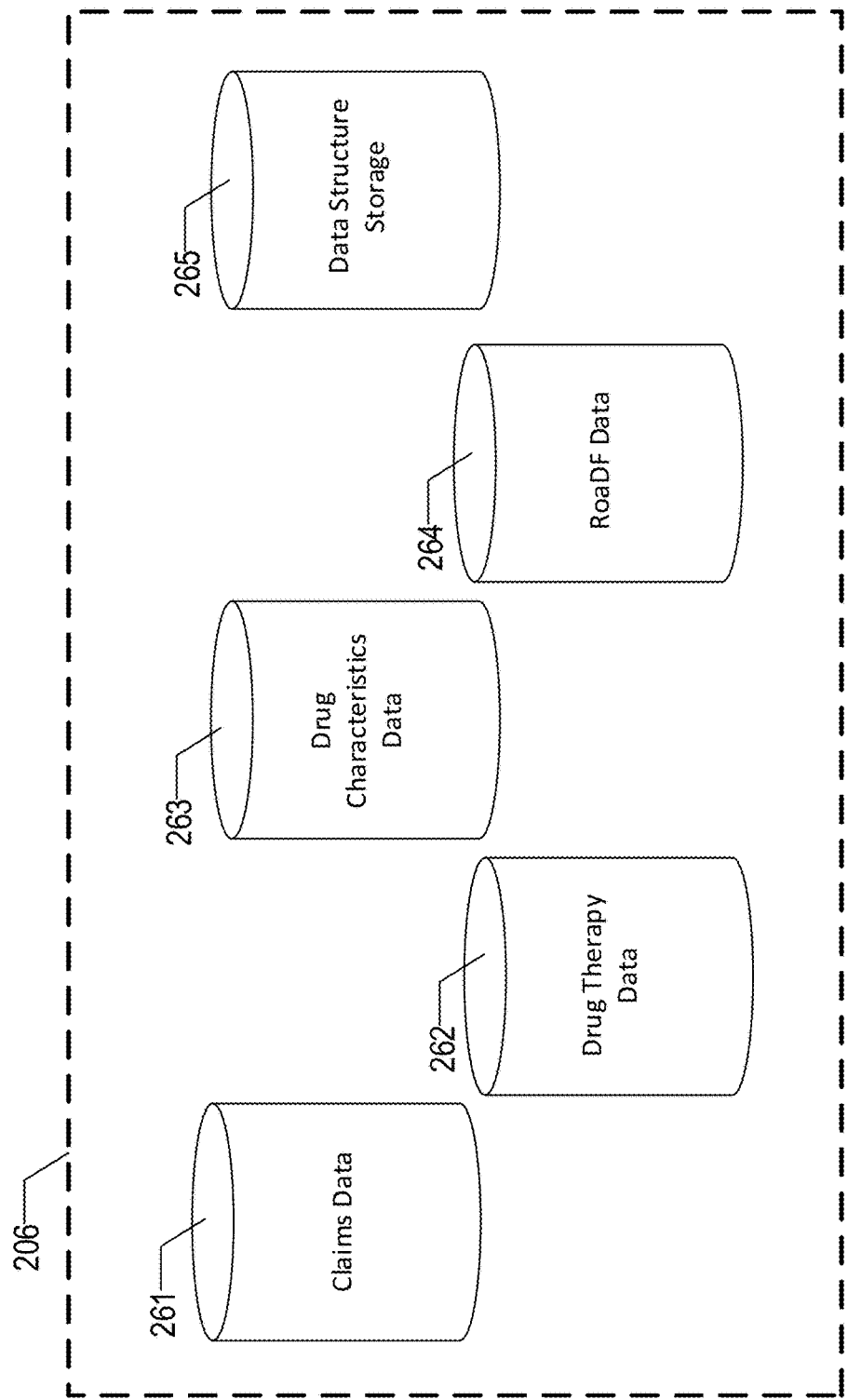

In certain embodiments, the memory media 206 may comprise a plurality of memory storage areas 261-265 as shown in FIG. 2B, each of the plurality of memory storage areas 261-265 configured for storing different data types. For example, memory storage areas 261-264 may be embodied as data sources that may be utilized for various embodiments of the present invention. For example, claims data 261, drug therapy data 262, drug characteristics data 263, and RoaDF (Route of Administration and Dosage Form) data 264 may each be stored in corresponding separate data storage areas. Although all of these data storage areas 261-264 are shown as being encompassed within memory storage area of the analytic computing entity 20, it should be understood that in certain embodiments, one or more of data storage areas 261-264 may be stored in association with a third party, external computing entity, and data contained therein may be received by the analytic computing entity 20 for performing one or more processes as discussed herein.

In certain embodiments, the claims data 261 may comprise data indicative of various medical and/or health-related records generated for a particular healthcare services member. For example, the claims data 261 may comprise medical services records indicative of medical procedures, office visits, and/or the like performed for a particular member. In certain embodiments, the claims data 261 comprises prescription data indicative of prescriptions filled on behalf of the member. In certain embodiments, the prescription data may be organized as a plurality of individual records each associated with a particular prescription event. Each record may comprise one or more of: (1) member identifying data (such as a unique member identifier, a government issued identifying number, a member name, and/or the like); (2) a first date of service, indicative of the date the prescription is filled (e.g., the date the member physically receives the prescription); (3) a drug identifier (e.g., a National Drug Classification (NDC) code, a scientific drug name, a drug trade name, and/or the like); (4) a prescription length (e.g., number of days-worth of supply is provided with the prescription); (5) a quantity (e.g., number of units of the drug provided, such as 30 pills, 800 mL, 30 oz., and/or the like); and/or the like. Additional data regarding the drug may be included with each prescription data record in certain embodiments, particularly where certain characteristics (e.g., non-temporal characteristics) of the drug are not discernable from the drug identifier. For example, each prescription data record may comprise data indicative of the type of unit associated with the prescription (e.g., "each" units, such as pills, suppositories, puffs, applications, shots, drops, and/or the like; measured fluid quantity units, such as milliliters, ounces, milligrams, and/or the like; and/or the like), the strength of each unit (e.g., each pill comprises 20 mg); and/or the like. The claims data 261 may comprise a plurality of data records, which may be stored within a fielded data store. However it should be understood that any of a variety of appropriate database storage techniques may be utilized to store discrete claims data records therein.

The claims data 261 may, in certain embodiments, further comprise member data providing additional data regarding each member. In certain embodiments, the member data may be stored in separate data storage areas from the remainder of the claims data. The member data may further comprise data indicative of the identity of the member, such as the member's name, gender, date of birth, and/or the like. Moreover, the member data may comprise data indicative of member eligibility for various claims, such as via health insurance eligibility. The member eligibility data may identify periods of time during which the member was eligible and/or ineligible for various claims, and accordingly the eligibility data may identify a plurality of time periods each identified as beginning and ending with a change in the member's eligibility status. As discussed in greater detail herein, the member eligibility data may be overlaid with the claims data and/or data structure data 265 (discussed herein) to provide additional data regarding the results of various processes discussed herein. In certain embodiments, the eligibility data may provide generic eligibility data indicative of only a current eligibility status of the member, which may further identify the start date associated with the member's current eligibility state.

As discussed herein, eligibility of a particular member may be relevant for reported complexity scores, because a particular member may be more or less likely to obtain necessary prescriptions depending on the member's payment options for the prescriptions. For example, health insurance often finances persons' medical and pharmacy expenses. Changes in health insurance within a calendar year, such as changes in policy coverage benefits, prescription formulary tiers, and/or switches or gaps in coverage may affect a person's utilization of health insurance. Therefore, changes such as the cessation of insurance coverage may reduce the scope of claims input into a recording application and may affect the accuracy of the output information. Accordingly, flagging various output reports with an indicator representing a cessation and/or lapse in health insurance coverage (e.g., a lapse in eligibility) may provide an indicator to a user that the resulting output may not reflect complete accuracy in the member's prescription complexity score.

With reference again to FIG. 2B, the memory storage areas 206 may further comprise drug therapy data 262, which may be indicative of various drug groupings that may be utilized for correlating common traits between various drugs. For example, the drug therapy data 262 may identify medical conditions for which a particular drug is prescribed to treat, a particular drug therapy associated with a drug, and/or the like. In certain embodiments, each drug is associated with a single drug therapy (or condition, referred to interchangeably herein), and a plurality of drugs may be associated with a single drug therapy. In other embodiments, each drug may be associated with one or more drug therapies, and one or more drugs may be associated with each drug therapy. In the latter embodiments, the particular drug therapy to be associated with a particular drug may be determined based on the claims data (e.g., a particular data field associated with a prescription data, or a separate data field identifying one or more known conditions associated with a particular member). The drug therapy data 262 may be stored in a mapping database linking each of a plurality of drug identifiers with corresponding drug therapies/conditions. In just one example, the drug therapy data 262 may be stored in a data structure having data identifying particular drugs being stored as drug nodes that are associated with corresponding drug therapy nodes identifying particular drug therapies. In embodiments in which each drug corresponds to a single drug therapy, each corresponding drug node may be stored in association with only a single corresponding drug therapy nodes. In embodiments in which each drug may correspond with a plurality of drug therapies, each drug node may be associated with a plurality of drug therapy nodes.

The memory storage areas 206 may further comprise drug characteristics data 263 stored in a corresponding memory storage area. The drug characteristics data may comprise data identifying (1) one or more unique drug identifiers for the particular drug (e.g., a plurality of unique drug identifiers, each corresponding with a different drug identification system); (2) dose frequencies for the drug (e.g., 1 (once per day), 2 (twice per day, 3 (three times per day); and/or the like); (3) maximum number of dosages per day; (4) route of administration of the drug (e.g., oral, topical, subcutaneous, hypodermic, and/or the like); (5) dosage strength (e.g., the strength per specific unit of a dosage, such as 40 mg/pill); (6) orphan flag (identifying whether the drug should or should not be considered during further processing, as discussed herein). Each drug may have one or more corresponding drug records, such as those illustrated in the example of Table 1, below. It should be understood that a single drug type may be associated with a plurality of drug records each associated with a variation of the particular drug type. For example, a first drug record may be associated with a first drug strength per unit (e.g., Drug 1 pills of 200 mg/each), a second drug record may be associated with a second drug strength (e.g., Drug 1 pills of 600 mg/each), and a third drug record may be associated with a second route of administration of the drug (e.g., Drug 1 IV drip).

TABLE 1

| Field Name | Field Definition |
| --- | --- |
| DrugID | Unique drug identification value. |
| ratioMultiple | May default to 1. Used when the ratio does |

TABLE 1-continued

| Field Name | Field Definition |
| --- | --- |
| | not follow the default definition of dosing frequency. Default dose frequency definition is 1 (once a day), 2 (twice a day), 3 (three times a day), 4 (four times a day), 5 (five times a day), 6 (six times a day) and/or the like. |
| frequencyLimit | Limit of count of dosage per day. Default may be set to 6, for example. May not contribute to complexity weighting, as discussed herein. |
| frequencyOverride | If included, value may override any frequency calculated as discussed herein. May not contribute to complexity weighting, as discussed herein. |
| multipleWeight | May be calculated if the frequency is greater than the calculated ratio (e.g., where each dosage requires more than 1 unit, such as instructions to take 2 pills at each prescribed dosing time). |
| roaID | Unique identifier identifying a route of administration (e.g., oral, topical, suppository, and/or the like). |
| dosageformID | Unique identifier identifying a dosage form (e.g., pill, tablet, solution, cream, and/or the like). |
| dosageStrengthNumber | Strength per specific unit, volume or mass. |
| productEngagement | (Orphan indicator) May identify a drug that has been flagged as not appropriate for complexity weighting calculations. For example, drugs used only in an inpatient setting, or drugs for which insufficient usage data has been collected may be inappropriate for inclusion in complexity weighting calculations. |

In certain embodiments, the drug characteristics data 263 may comprise data indicative of one or more complexity weights for each drug record. As discussed in greater detail herein, the complexity weights may be provided based on the number of units prescribed to take for each dosage, the frequency of prescribed dosages, and/or the like.

Moreover, in certain embodiments, the memory storage area 206 may further comprise RoaDF data 264 providing additional data regarding the route of administration of a drug as well as the dosage form of the drug. The RoaDF data 264 may be provided as a mapping data table providing additional data mapping particular combinations of roaID and dosageformID (which may be provided in the drug characteristics data 263, discussed herein) with particular drug dosage instructions, warnings, and/or the like. Although illustrated as being within memory storage area 206, it should be understood that the RoaDF data 264 may be maintained in association with an external computing entity configured for periodically updating and/or populating the RoaDF data 264 for various drugs. In such embodiments the RoaDF data 264 may be provided from the external computing entity as needed to perform various functionalities discussed herein. Moreover, the RoaDF 264 data may further comprise data indicative of one or more complexity weighting values associated with each combination of roaID and dosageformID, as discussed in greater detail herein.

Finally, as indicated in FIG. 2B, the memory storage area 206 may comprise data structure storage 265 configured for storing generated data structures for each member, as discussed in greater detail herein. However, it should be understood that in certain embodiments, generated data structures may not be permanently stored, but instead may be transmitted to one or more additional computing entities.

In certain embodiments, the data structures may be embodied as multi-level data structures specifying data regarding various drugs prescribed to members as a function of time. The data structures may comprise a plurality of nodes, and each of those nodes may be indicative of the identity of a particular member for which the data structure is associated, indicative of the identity of particular drug therapy treatments, and/or indicative of particular drugs, respectively. Such nodes may be arranged hierarchically and/or the nodes may be arranged in other data structures providing data indicative of relevant associations between nodes. Moreover, nodes may have a plurality of associations (e.g., direct associations and/or indirect associations) therebetween. For example, individual drug nodes may be associated with one or more time frame nodes, one or more drug therapy nodes, and/or the like.

The nodes may comprise member nodes indicative of the identity of a particular member for which all associated nodes are related (although these member nodes may be omitted in embodiments in which data is processed for a single member at a time). The nodes may further comprise time frame nodes each identifying a particular time frame during which a member's drug prescriptions remain constant (e.g., determined based at least in part on a time-series duration for each of a plurality of merged data records, and determined between consecutive prescription events (e.g., the starting of a prescription, the ending of a prescription, and/or the like). The nodes may further comprise drug nodes indicative of individual drugs prescribed to a particular member during one or more time periods, and/or drug therapy nodes indicative of particular drug therapies represented by the one or more drugs prescribed to the particular member. Because the drug nodes may be associated directly with particular time frames (and may be associated with multiple time frames in certain embodiments) as well as particular drug therapy nodes, various embodiments are configured for determining an overall complexity score for a particular member's drug prescriptions during a particular time frame (considering all drugs prescribed during the particular time frame) as well as drug prescriptions associated with individual drug therapies.

In certain embodiments, the data structure 265 is configured to automatically identify a particular node type (e.g., member, time frame, drug, drug therapy, etc.) based on the content of data to be associated with the node. For example, data indicative of a particular time period during which a member's drug prescriptions remain unchanged may be automatically identified as data to be associated with a time frame node. Data indicative of a particular drug therapy may be automatically associated with a drug therapy node, and data indicative of a particular drug may be automatically associated with a drug node.

In one embodiment, the analytic computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 20 with the assistance of the processing element 205 and operating system.

As indicated, in one embodiment, the analytic computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 20 may communicate with computing entities or communication interfaces of other computing systems 20, user computing entities 30, and/or the like.

As indicated, in one embodiment, the analytic computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analytic computing entity 20 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The analytic computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's 20 components may be located remotely from other computing system components, such as in a distributed system. Furthermore, one or more of the components may be aggregated and additional components performing functions described herein may be included in the analytic computing entity 20. Thus, the analytic computing entity 20 can be adapted to accommodate a variety of needs and circumstances.

b. Exemplary User Computing Entity

Figure 3:
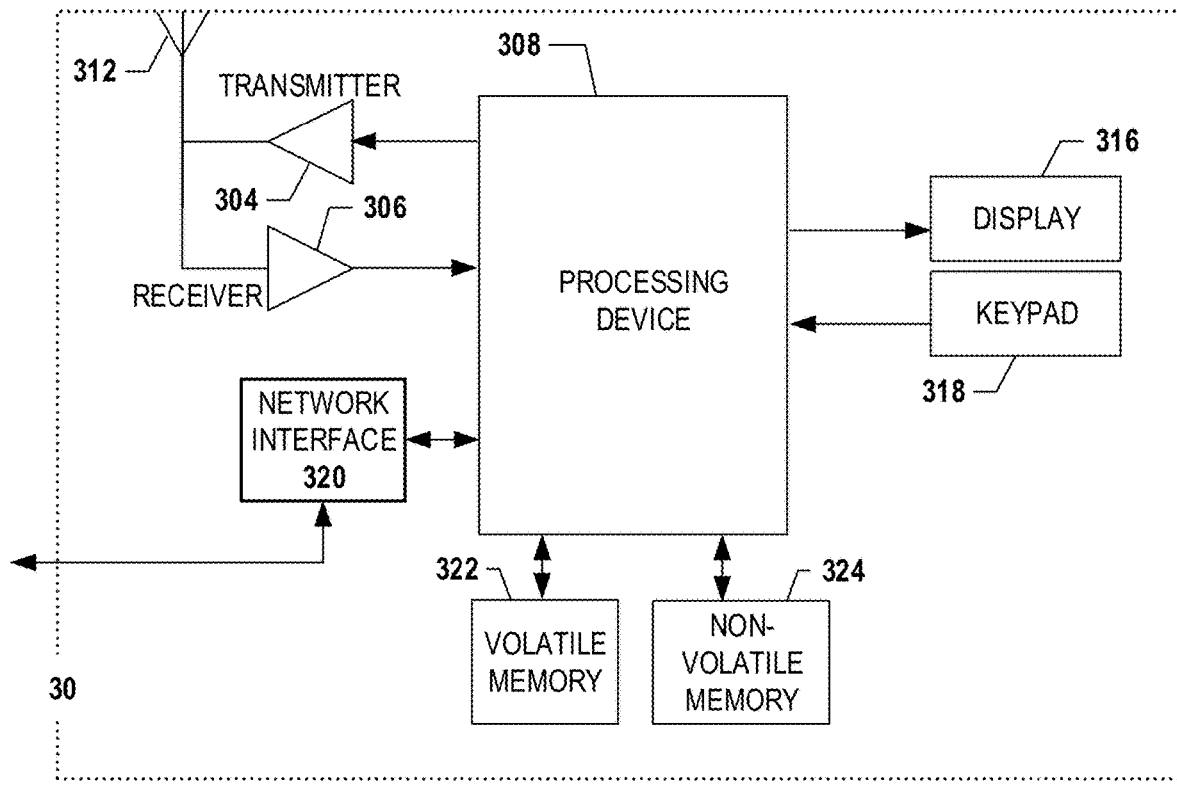
FIG. 3 is a schematic of a user computing entity in accordance with certain embodiments of the present invention.

FIG. 3 provides an illustrative schematic representative of a user computing entity 30 that can be used in conjunction with embodiments of the present invention. As shown in FIG. 3, a user computing entity 30 can include a network interface 320, an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an analytic computing 20, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing device 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, any two or more of the illustrative components of the architecture of FIG. 1 may be configured to communicate with one another via respective communicative couplings to one or more networks 35. The networks 35 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 35 may have any suitable communication range associated therewith and may include, for example, global networks (e.g., the Internet), MANs, WANs, LANs, or PANs. In addition, the networks 35 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operation

Details regarding various embodiments regarding the functionality of the system 100 as discussed herein is described in reference to the flowcharts of FIGS. 4-7 and graphical outputs of FIGS. 8-12.

Figure 4:
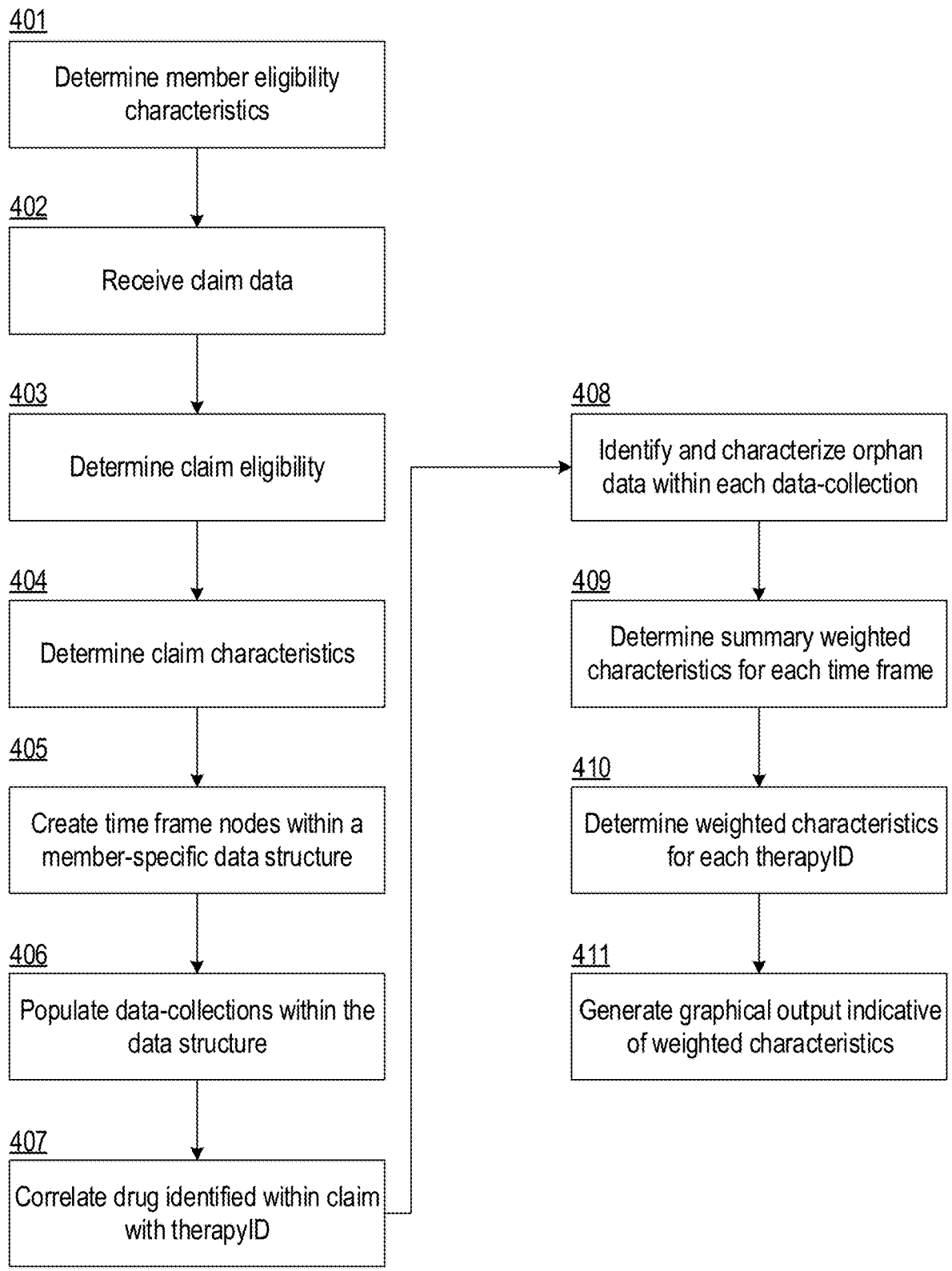
FIG. 4 is a flowchart providing an overview of various processes performed by an analytic computing entity according to various embodiments.

FIG. 4 is a flowchart illustrating various steps to be performed according to one embodiment for combining prescription data from multiple time-series based prescription data records into merged data records for a particular member, and for generating prescription complexity scores for the member. Various embodiments perform such methodologies in a batch-style process in which data associated for a particular member is calculated and the methodology is completed for the single member's data prior to beginning calculations for a different member. However, it should be understood that one or more steps may be performed for a plurality of members simultaneously and/or in any order.

With reference first to FIG. 4, which illustrates a flowchart providing an overview of steps involved in a methodology according to one embodiment, various methods may begin by determining eligibility characteristics indicative of a particular member's eligibility, as indicated at step/operation 401. As discussed above, steps for determining a member's eligibility characteristics may be omitted in certain embodiments. However, a particular member's eligibility data may be indicative of the relative accuracy of results provided from various processes as discussed herein, and accordingly including processes for determining a member's eligibility characteristics may be utilized to provide flags or other data identifiers to a system user that may be utilized to interpret the likely accuracy of the results.

In certain embodiments, determining a member's eligibility characteristics encompasses steps for retrieving member data (e.g., from the claims data 261 storage area), and identifying dates at which the member's eligibility status changed. For example a change in scope of coverage (e.g., determining whether prescriptions are covered by insurance, determining whether prescriptions are only partially covered by insurance, determining whether a member's entire insurance policy lapsed, and/or the like) may be identified based on data stored within the member data corresponding to a particular member. In certain embodiments, the member data may comprise a pharmacy flag identifier providing data indicative of whether the member had pharmacy coverage under a respective plan.

The eligibility data may comprise data indicative of dates representing the first date on which the member became covered under a particular insurance plan and the last date of the member's coverage. In certain embodiments, if no dates are provided within the member data, the analytic computing entity 20 may be configured to determine that the member is enrolled for an entire relevant period. Moreover, the eligibility data may provide eligibility term dates, indicating a plurality of time periods during which the member was covered by a relevant insurance plan. Eligibility data according to certain embodiments may be provided via a fielded data record comprising a plurality of data fields relevant to determining a member's eligibility. In certain embodiments, a plurality of eligibility records may be provided for a particular member, indicative of discrete periods of time during which different coverages were applicable for a member. Example data fields that may be included in the one or more eligibility data records are summarized in Table 2, below.

TABLE 2

| Field Name | DataType | Summary of Usage |
| --- | --- | --- |
| MemberID | AlphaNum | Uniquely identifies a member for which the claim relates (may encompass a plurality of fields, such as a member ID and a family ID field, in certain embodiments). |
| InsuranceID | AlphaNum | Identifies the member's insurance coverageprofile (may be null or blank). |
| Gender | AlphaNum | Member gender (may be null or blank). |
| Date of Birth | Date | Member's date of birth (may be null or blank). |
| Member Beginning Eligibility date | Date | Used to determine if member has minimum required eligibility (may be null or blank). |
| Member Beginning Eligibility date | Date | Used to determine if member has minimum required eligibility (may be null or blank). |
| Pharmacy coverage | AlphaNum | Indicates whether coverage according to the member's insurance includes pharmacy coverage. |

Moreover, in certain embodiments, eligibility characteristics of a member determined according to step/operation 401 may be determined according to defined time periods, such that member eligibility may be determined based on user-specified time periods of interest. The eligibility characteristics may further be utilized in certain embodiments to exclude various prescriptions from evaluation in accordance with various embodiments of the present invention. For example, if a particular member is not eligible for coverage on a determined first day of service of a particular prescription, the prescription may be excluded from complexity calculations, and a member eligibility flag may be generated and included in resulting output.

Ultimately, various embodiments are configured to store data indicative of membership eligibility characteristics in a memory (e.g., in a temporary memory storage area, such as a cache) during processing of the remaining steps as discussed herein, and the analytic computing entity 20 may be configured to provide a membership eligibility indicator within generated output, as discussed herein.

With reference to step/operation 402 of FIG. 4, embodiments according to the present invention continue by receiving claim data relevant for a particular member. The analytic computing entity 20 retrieves claims data 261 relevant for a particular member, and utilizes date of service and days' supply data fields within a particular claim record to establish duration of drug exposure for the member. The claims data may be stored as a prescription claims record comprising a plurality of data fields each providing relevant data regarding a particular prescription data record. In certain embodiments, the claims data fields may comprise temporal-based data, such as an initiation date (first date of service) and/or a duration, as well as characteristic data, such as drug identifier data, number of units per dosage data, number of dosages per day data, and/or the like. Example data fields included in claims records according to certain embodiments are provided in Table 3, below:

TABLE 3

| Field Name | DataType | Summary of Usage |
| --- | --- | --- |
| MemberID | AlphaNum | Uniquely identifies a member for which the claim relates (may encompass a plurality of fields, such as a member ID and a family ID field, in certain embodiments). |
| First Date of Service | Date | The first date covered by this claim (the initiation date for the claim). |
| DrugID | Num | Unique drug identifier, such as an NDC code. |
| Days Supply | Num | Number of days' supply given for a drug. |
| Quantity Count | Num | Quantity count dispensed for a drug (e.g., provided in terms of a given unit, such as "each," "mL," "mg," and/or the like. |

Additional data fields may be included in certain claim records, such as prescribed dosage amount (e.g., number of units per dose), prescribed dosage end date (e.g., last day for taking the drug according to the prescription), and/or the like. In embodiments comprising such additional data fields, data included within the claims record may override calculations performed by the analytic computing entity 20 as discussed herein.

Moreover, as indicated at step/operation 403, the analytic computing entity 20 determines claim eligibility for the retrieved claims data. Determining eligibility for a particular claim may be relevant for determining whether data provided in relation to the particular claim is accurate, or is subject to potential inaccuracies that may result from a member utilizing other, unrecorded mechanisms for obtaining drugs according to the prescription. Like the member eligibility determination discussed in reference to step/operation 401, determining claim eligibility may be an optional step according to various embodiments. However, the analytic computing entity 20 may utilize data indicative of claim eligibility to determine whether to include or exclude particular claims in complexity calculations as determined herein. In various embodiments, determining claim eligibility comprises querying a claim data record to determine whether any claim exclusion or claim ineligibility flags are included therein. As an alternative, determining claim eligibility may comprise steps for retrieving data indicative of the scope of a particular member's eligibility, and comparing eligibility criteria for claims as established within the member data with data regarding a particular claim to determine whether the claim satisfies applicable eligibility criteria.

As indicated at step/operation 404 of FIG. 4, the analytic computing entity 20 determines various characteristics of the identified claims for a particular member. The process for determining claim characteristics is expanded within the illustrated flowchart of FIG. 5.

Figure 5:
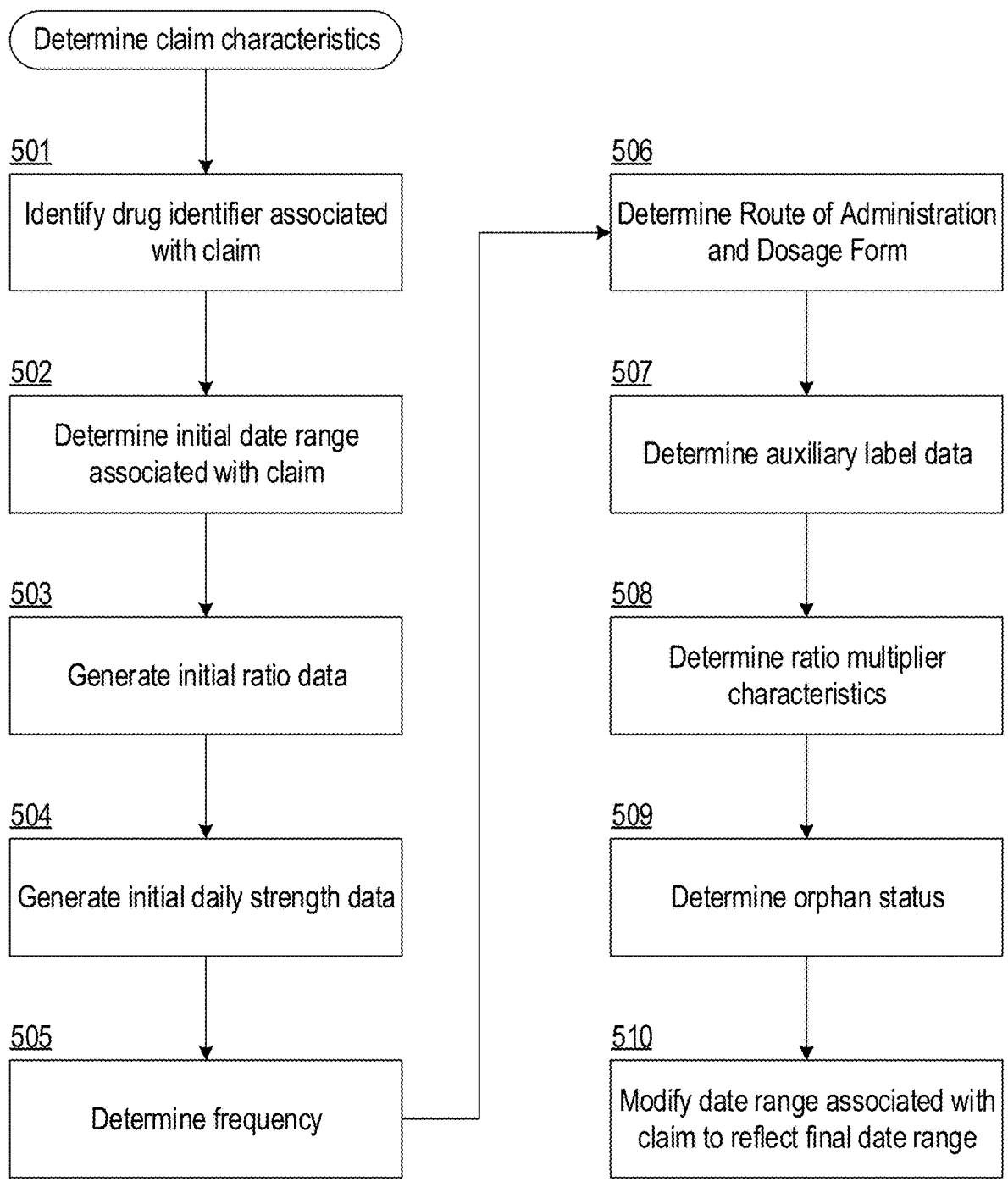
FIG. 5 is a flowchart illustrating steps/operations for determining claim characteristics according to various embodiments.

As discussed therein, determining claim characteristics may begin with identifying a drug identifier associated with the claim, as indicated at step/operation 501 of FIG. 5. The analytic computing entity 20 may be configured for utilizing any of a variety of drug identifiers, such as cross-platform drug identifiers (e.g., NDC codes, Generic code number (GCN), and/or the like) or platform-specific drug identifiers utilized with the analytic computing entity 20 and unused by other platforms. In certain embodiments, the system is configured to identify both a cross-platform drug identifier and a platform-specific drug identifier for use in identifying a particular drug. Moreover, the drug identifiers may be unique to a particular drug formulation and/or the drug identifiers may be unique to a particular form of the drug. As an example, a drug identifier for a 20 mg caplet of Drug A may be different from a drug identifier for a 100 mg caplet of the same Drug A. Likewise, an elixir of the same Drug A may have yet a different drug identifier.

As mentioned above, the analytic computing entity 20 utilizes data indicative of the date of service and days' supply (as provided within respective fields in the claims data record) to determine a date range and duration of drug exposure to the user as indicated by the claim (indicated at step/operation 502). Since the analytic computing entity 20 is configured to determine a complexity score covering every day where a member had evidence of active drug therapy, the analytic computing entity 20 is configured to identify characteristics (e.g., non-temporal aspects, such as the drug strength, route of administration, dose form, drug name, and/or the like) as well as changes in those characteristics (e.g., around drug refills) to ascertain how a particular prescription will result in a duration of a drug exposure. A duration of drug exposure (e.g., reflected by a merged data record of a plurality of individual claim data records each associated with a particular prescription) may be calculated based on certain characteristics of the drug's prescription (e.g., drug start and/or end date, days' supply, prescription frequency, quantity per dosage, and/or the like), thereby providing data indicative of the prescribed medication regimen to the exclusion of data indicative of the member's actual behavior. For example, in embodiments in which a claim record does not comprise explicit data indicative of prescribed duration, the analytic computing entity 20 may be configured to calculate a time-series duration (e.g., a total date range associated with the merged data record) and initial duration for a prescription based on provided data indicative of the initial date of service, data indicative of the total days' supply, and data indicative of the quantity provided. By dividing the quantity provided by the total days' supply, the analytic computing entity 20 calculates an initial ratio for the claim, as indicated at step/operation 503 of FIG. 5, and an initial daily strength for the drug, as indicated at step/operation 504. Calculating the initial daily strength may require additional data indicative of a strength of each dose or each unit, which may be included within the claims data or which may be retrieved from a drug characteristic data store based at least in part on the drug identifier included within the claims data. As a specific example, if a particular member is prescribed 60 pills of Drug A (at a 20 mg/pill strength) with a 30 days' supply, the analytic computing entity 20 may be configured to calculate an initial ratio of 2, indicating the member takes 2 pills per day, and calculates an initial daily strength of 40 mg/day, indicative of the collective strength of the 2 prescribed pills the member takes per day. However, as mentioned herein, the daily strength calculations and/or the initial ratio may be overridden based on data stored in a drug characteristics data store or data provided with the claim data record.

In addition to determining dates of drug exposure for a member, steps for determining claim characteristics, reflected at step/operation 404 of FIG. 4, further comprise steps for determining various claim characteristics that may be indicative of the claim's complexity, as indicated at steps/operations 505-508 of FIG. 5. As discussed herein, components of complexity may comprise (1) dosing frequency; (2) RoaDF (route of administration and dosage form); (3) auxiliary labels; (4) multiple units per dose; (5) age, (6) gender, and/or the like. In certain embodiments, the age and/or gender of a particular patient may be assigned a complexity weight and may be added to one or more of the generated complexity scores for the member.

Dosing frequencies determined by the analytic computing entity 20 (as indicated at step/operation 505 of FIG. 5) encompass a plurality of dosing instructions (e.g., commonly utilized dosing instructions). Frequencies that may be determined based on regularly scheduled dosing are included. Specifically timed dosing frequencies that are dependent on a member's activities may not be considered in this aspect of complexity (e.g., take 1-hour prior to sleep; take before breakfast, and/or the like), although these instructions may be considered within the auxiliary labels component of complexity discussed herein. Example dosing frequencies may comprise: once per day; twice per day; once every 2 months; once every 6 weeks; 6 times per week; take one dose as needed; once every five years; once a day for 3 weeks, take one week off, then repeat; once every 72 hours; and/or the like.

In certain embodiments, the claims data for a particular claim may not contain explicit indications of a prescribed dosing frequency, and accordingly the analytic computing entity 20 of certain embodiments automatically determines the dosing frequency based at least in part on data indicative of a supply (quantity) and days' supply. The analytic computing entity 20 is configured to determine a dosing ratio by dividing the provided supply data by the provided days' supply data to determine a dosing frequency. Such calculations may be provided for measurable quantities prescribe per dose, such as a dose of "each" (e.g., take 1 pill) or a measured quantity (e.g., take 30 mL). For prescriptions having immeasurable dosages the analytic computing entity 20 may be configured to replace the dosing frequency with a default frequency value (e.g., determined based at least in part on clinical experience and/or pharmacy reference information/data).

In various embodiments, the system is configured to utilize frequency limits and/or frequency overrides as defined within the claims data and/or within data stores of data utilized during operation of the analytic computing entity 20. Frequency limits and/or frequency overrides may be defined on a drug-specific basis (e.g., that may be retrieved from drug characteristics data 263) or on a system-wide basis. As a non-limiting example, if Drug B has a claim with 60 tablets and a 30 day supply, the frequency ratio calculation determines a frequency of 2 tablets per day for the prescription (60 tablets divided by 30 days' supply). However, if Drug B is an extended release formulation and drug characteristics data identifies a once/daily dosing, a frequency override of once daily may be applied, and subsequent complexity calculations may be based on the once daily frequency. Such a prescription may thereby be indicative of a dosing schedule of 2-tablets, taken once per day.

Moreover, for medications having a "take as needed" dosing, a standard dosing regimen may be defined as a range (e.g., 2-3 times per day). For these medications, the analytic computing entity 20 may be configured to utilize the lowest frequency to avoid bias toward more complex weights.

Similarly, if a medication has a highly variable dosing frequency, the dosing frequency weight assigned may be set to a lowest-complexity level to minimize over-inflation of a resulting complexity score.

As discussed herein, when calculating the contribution of dosing frequency to the total complexity weight, the analytic computing entity 20 sums the dose frequency weights of all unique active drugs. For example, if three different drugs are taken twice a day, the dose frequency weight for "twice a day" is counted three times. Such calculations may be applicable to summary complexity scores as well as drug therapy specific complexity scores, as discussed herein.

As indicated at step/operation 506 of FIG. 5, the analytic computing entity 20 may be further configured to determine a route of administration of the drug, as well as a dosage form for the drug when determining various claim characteristics. With respect to the RoaDF component of claim characteristics, the route of administration is analyzed collectively with the dosage form. Dosage form (e.g., solution, suspension, elixir, tablet, pill, caplet, and/or the like) may have little influence on the overall complexity of a medication regimen, however it impacts the route of administration. Route of administration, by contrast (e.g., oral, suppository, shot, topical application, and/or the like) may provide a greater impact to a member's difficulty in adherence to a particular medication regimen. The analytic computing entity 20 may be configured to consider the most common combinations of route of administration and dosage form that are utilized for out-patient and/or home-use prescriptions, and may exclude those combinations that are utilized exclusively within an inpatient or supervised setting.

In certain embodiments, data indicative of the route of administration and dosage form may be included within the claims data. However, in instances in which the route of administration and dosage form is not included within the claims data, the analytic computing entity 20 is configured to retrieve such data from the RoaDF data 264, for example utilizing a unique drug ID to query the RoaDF data store, and to retrieve RoaDF data 264 mapped to the particular unique drug ID. In certain embodiments, the RoaDF data 264 may itself comprise data indicative of weights to be assigned to the drug based on the RoaDF data 264, however in other embodiments the analytic computing entity 20 is configured to retrieve weight data from other data stores as discussed herein. The retrieved RoaDF data 264 for a particular claim may be stored in a memory (e.g., a cache) while remaining steps of the described methodology are completed.

When determining the contribution of the RoaDF to the total complexity weight, the analytic computing entity 20 sums the dose form weights in such a way as to avoid over-inflation of the total complexity score. The weight for each active drug's unique RoaDF is applied once to the total. For example if a patient took three different drugs in a day, and they were all oral tablets, the weight for "oral tablet" would apply only once to the total. Such calculations may be applicable to summary complexity scores as well as drug therapy specific complexity scores, as discussed herein. Accordingly, the summary complexity score may not be equal to the sum of each drug therapy complexity score in certain instances.

Moreover, determining claim characteristics additionally comprises steps for determining auxiliary label data, as indicated at step/operation 507 of FIG. 5. Auxiliary instructions may be included in a prescription's directions for use, however it is common for prescribers to rely on auxiliary labels attached at the point of service, and data indicative of such auxiliary labels is often omitted from the claims data. Accordingly the analytic computing entity 20 may retrieve auxiliary instructions data from the drug characteristics data 263. In various embodiments at least a portion of the drug characteristics data 263 is retrieved from a third-party data store, such as First Databank, which compiles data indicative of auxiliary label instructions by route of administration, dosage form, drug ID, and/or the like.

In certain embodiments, the drug characteristics data 263 comprises data indicative of weighting to be applied for a drug based on auxiliary instructions. However, the analytic computing entity 20 of various embodiments is configured to compare components of the auxiliary instructions retrieved from the drug characteristics data 263 against one or more auxiliary instructions weighting criteria to assign an appropriate auxiliary instructions weight for the drug prescription. For example, auxiliary instructions for various drugs may be identified from one or more data stores (e.g., external data stores), and such auxiliary instructions may be represented by auxiliary instructions identifiers (e.g., numeric or alpha-numeric codes) mapped to particular drug identifiers, such that a particular drug identifier may be utilized to retrieve an associated auxiliary instructions identifier. These auxiliary instructions identifiers may be assigned particular weights at the analytic computing entity 20, and the appropriate weights may be retrieved for a particular drug based at least in part on the auxiliary instructions identifiers determined to be associated with the particular drug. For example, the analytic computing entity 20 may be configured to sum the sub-weights identified to determine a total weight for the auxiliary instructions. The weight for each active drug's unique auxiliary instruction may only be applied once to the total. For example, if a patient took three different drugs in a day, and they all had the same "take on an empty stomach one hour before a meal" auxiliary label, the weight for "empty stomach one hour before a meal" only applies once to the total. Such calculations may be applicable to summary complexity scores as well as drug therapy specific complexity scores, as discussed herein. Accordingly, the summary complexity score may not be equal to the sum of each drug therapy complexity score in certain instances.

Finally, the analytic computing entity 20 may be configured to consider multiple unit dosages as particular drug characteristics (reflected at step/operation 508 of FIG. 5). As discussed above, the analytic computing entity 20 may be configured to determine a frequency ratio as well as a prescribed frequency (which may be different), which provides an indication of whether a single unit is to be taken as a dose, or whether a plurality of units are prescribed to be taken as a single dose. Where the ratio (prescription quantity divided by days' supply) is greater than the prescribed frequency, a multiple weight is applied. This indicates that the prescribed dose includes multiple units, such as two pills per dose.

When calculating the contribution of multiple dose weight to the total complexity, the analytic computing entity 20 sums the weight of all unique active drugs with a multiple dose weight applied. For example, if three different drugs taken in a day each consist of 2 tablets per dose, the multiple weight is counted three times. For each specific drug therapy, the analytic computing entity 20 sums the total multiple unit weights of all unique active drugs assigned to that drug therapy.

As indicated at step/operation 509, the analytic computing entity 20 may be configured to further determine the orphan status of a particular claim. A claim may be indicated as an orphan based at least in part on the drug identifier included within the claim, the location where a drug was administered (if data is available), based on a query of other claims data associated with the member (e.g., querying services data indicating whether a member was hospitalized during the date that a particular prescription was filled), and/or the like. As discussed in greater detail herein, the orphan status for a particular claim is indicative of whether the claim is to be included in subsequently determined complexity calculations, or whether the claim is to be omitted from such calculations. Claims for prescriptions administered in an in-patient setting may be omitted from complexity calculations, for example, because any complexity of the member's prescription regimen is overseen by hospital professionals, thereby rendering the complexity to the member as effectively moot. Moreover, other claims may be indicated as orphan claims in the event that the particular claim is unsuitable for complexity calculations. For example, claims having highly variable dosing instructions may be unsuitable for complexity calculations, or claims requiring drug administration instructions not reflected within existing complexity calculation algorithms may be excluded from further complexity calculations.

Moreover, claim characteristics for a particular claim may change over time (as reflected at step/operation 510 of FIG. 5) as a prescription changes and/or is refilled by the member, and accordingly the analytic computing entity 20 is configured to modify claim characteristics data associated with the claim, such as various dates associated with the claim (e.g., dates associated with a merged data record reflective of the series of claims associated with a prescription) as needed upon detection of new claims reflecting a prescription refill, extension, modification, and/or the like. The modifications may reflect overlaps in prescriptions, gaps between prescription fills, and/or the like and are ultimately reflected in a final, time-series duration (e.g., date range) for a particular merged data record (e.g., merged claim) as determined by the analytic computing entity 20 and as reflected in the flowchart spanning FIGS. 6A-6B.

Modifications to initial date range determinations for a single claim are generated based on the identification of additional matching data records (e.g., claims) matching a particular claim for which a date range has already been determined. Thus, as indicated in step/operation 601 of FIG. 6A, the process begins by identifying matching data records by, for example, determining whether the drug identification associated with a particular claim record matches the drug identification associated with any previously existing drug records. If the drug identification of a claim does not directly match any particular drug identifications of existing claims exactly, the analytic computing entity 20 may be configured to determine whether the drug identification matches within the same codeset of any existing claim records, as indicated at step/operation 602. A match at the codeset level may indicate that particular drugs include the same clinical formulation. For example, an original and generic version of the same drug may have different drug identifiers, but the different versions may match the same drug codeset. Accordingly, the analytic computing entity 20 is configured to identify matching drugs taken by a particular member, even if the member switches to a lower cost generic version of drug at a particular refill.

However, if the drug identifier for a newly identified claim record is determined to match the drug identifier of one or more additional claim records (or if the claim record is identified to have a matching codeset with an existing claim record), the analytic computing entity 20 is configured to review other claim characteristic data, for example, by reviewing other non-temporal aspects of a claim by determining whether the orphan status also matches between the new claim record and the existing claim record identified to have a matching drug identifier, as indicated at step/operation 603. If the orphan status does not match (e.g., the new claim record includes a positive orphan status identifier and the existing claim record includes a negative orphan status identifier), or if the claim record is not determined to match any previously existing codesets, the analytic computing entity 20 identifies the claim as an entirely new claim, and is configured to set the final date range based on the days' supply of the drug corresponding to the new claim record, as indicated at step/operation 604 (however, it should be understood that this "final" date range may be considered an "initial" date range if a later-identified claim record is determined to match the drug and/or codeset identified within the claim record).

However, if the orphan status is determined to match between the new claim record and the prior claim record, this may be indicative of matching data records that may be utilized to create (e.g., temporarily) a merged data record having a combined time-series duration generated based at least in part on the matching data records that may be utilized to consider the continuous usage of a particular drug when identifying continuous time periods when constructing a data tree structure. Accordingly, the analytic computing entity 20 may then compare dates associated with the identified potentially matching records to calculate a gap or overlap between the date ranges associated with each of the individual records, as indicated at step/operation 605.

Figure 6A:
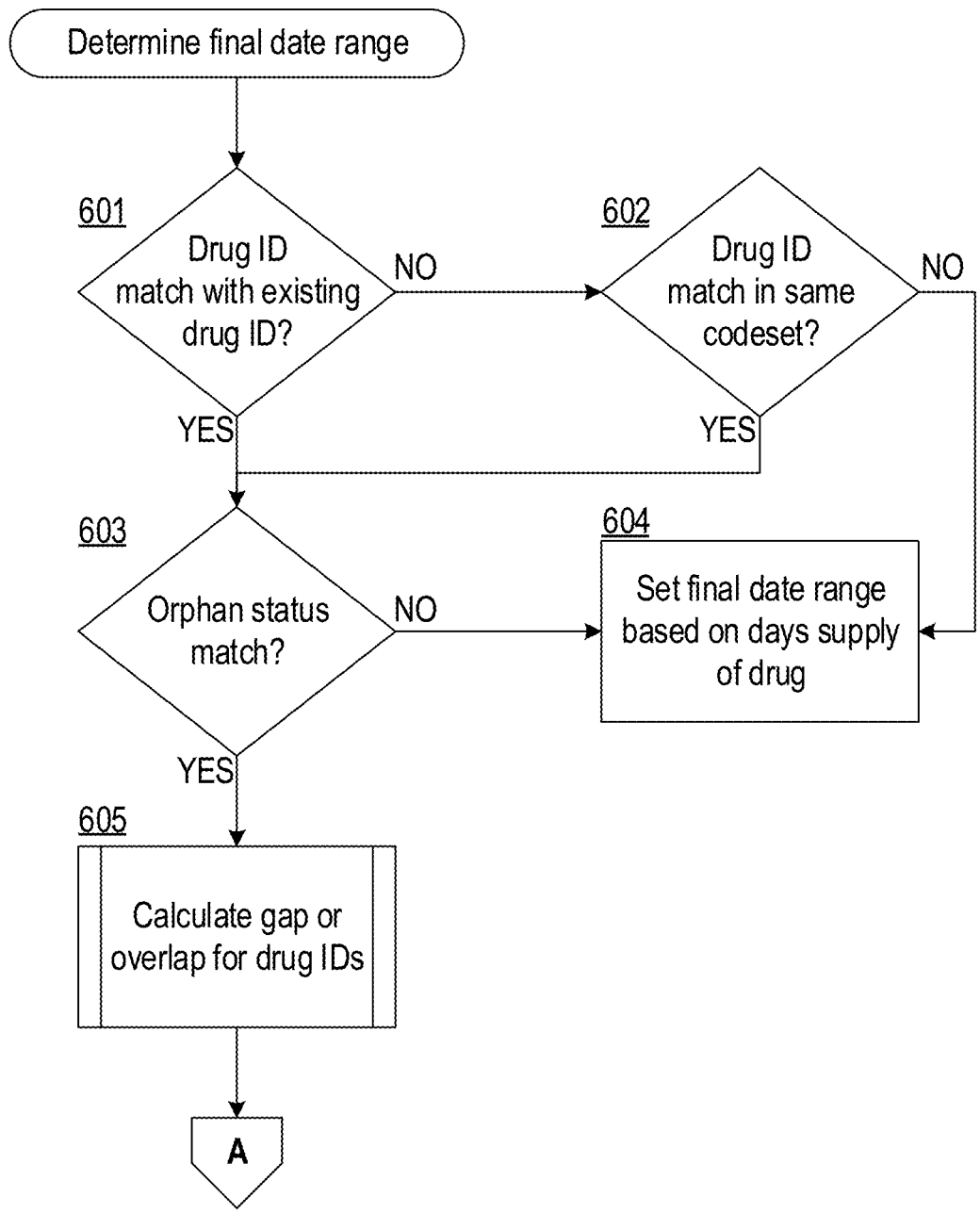
FIGS. 6A-6B collectively illustrate a flowchart for determining a final date range for a particular claim according to various embodiments.
Figure 6B:
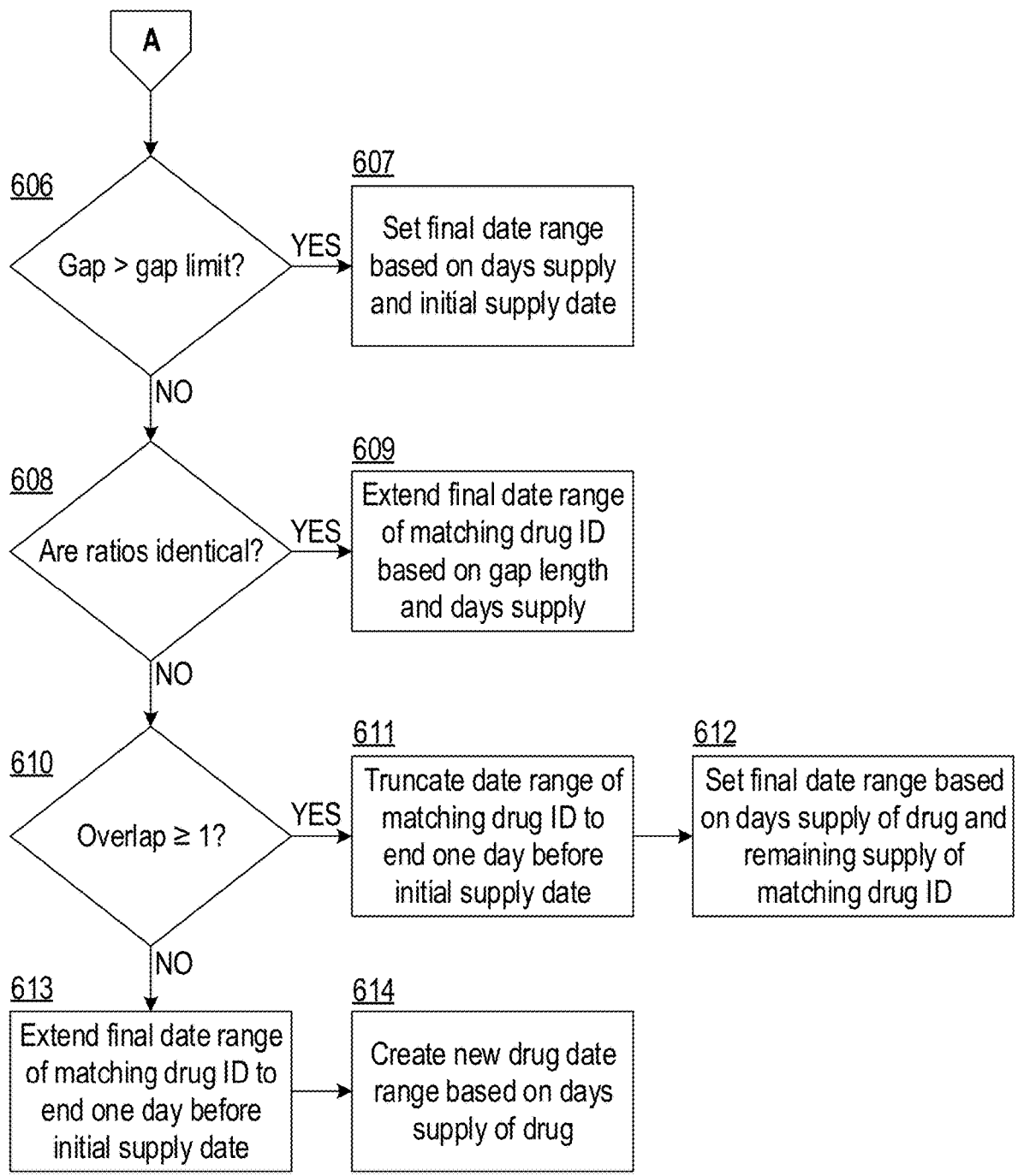

As indicated at step/operation 606 of FIG. 6B, if a gap is identified between the date ranges associated with the records, the analytic computing entity 20 compares the gap against a gap limit as defined within data stored in association with the analytic computing entity 20. In certain embodiments, the gap limit may be hard-coded within the functionality of the analytic computing entity 20, although in other embodiments the gap limit may be user configurable, based at least in part on user input received via a setup interface of the analytic computing entity 20. If the gap between records is larger than the gap limit, the analytic computing entity 20 is configured to treat the records as separate prescription events, and accordingly the analytic computing entity 20 sets the final date range based on the days' supply and initial supply date associated with the new claim record, as indicated at step/operation 607 (however, it should be understood that this "final" date range may be considered an "initial" date range if a later-identified claim record is determined to match the drug and/or codeset identified within the claim record).

If the analytic computing entity 20 determines that the gap is less than the gap limit (or no gap exists between the dates associated with the considered claims), the analytic computing entity 20 is configured to compare the ratios determined for each claim (for example, as determined according to the methodology discussed in reference to step/operation 503 of FIG. 5). A determination that the ratios are identical may indicate that the prescriptions associated with the claims are identical, including having identical dosages per day, identical strength per day, identical units per dosage, and/or the like. Upon determining that the ratios are identical, as indicated at step/operation 608, the analytic computing entity 20 may be configured to combine the claims and extend the date range of the matching claim based on the gap duration between the claims (if applicable) and the days' supply of the new claim, as indicated at step/operation 609.

In certain embodiments in which the unique drug identifier is indicative of unique ratios, step 608 may be omitted, as a match between unique drug identifiers provides data indicative of the identical ratios.

However, if the analytic computing entity 20 determines that the ratios are not identical, the analytic computing entity 20 is configured to determine whether the overlap between claim date ranges (if applicable) is greater than one day, as indicated at step/operation 610. Such an overlap may be indicative of the member refilling a prescription (or receiving a new prescription) prior to the exhaustion of the prescription associated with the prior claim. If the analytic computing entity 20 determines that the overlap is greater than one day, the analytic computing entity 20 is configured to truncate the date range of the prior claim having the matching drug identifier to end one day before the initial supply day of the new claim, as indicated at step/operation 611. Because of the change in ratio (as identified at step/operation 608), the analytic computing entity 20 is configured to end the claim associated with the prior, unchanged ratio as of the day the newly introduced ratio is begun, such that dosages prescribed for days after the date of initiation of the changed ratio are reviewed based on the updated ratios. The analytic computing entity 20 then sets the final date range for the new claim based on characteristic data associated with the prior claim, specifically the supply of the drug remaining from the prior claim, the updated ratio, and characteristic data associated with the new claim, specifically the quantity associated with the new claim (as indicated at step/operation 612).

As shown at step/operation 613 of FIG. 6B, if the analytic computing entity 20 determines that the overlap is less than one day (e.g., if there is no overlap or gap or if the gap duration is less than the maximum gap duration), the analytic computing entity 20 is configured to extend the final date range of the prior claim having the matching drug identifier to end one day before the initial supply date of the new claim, and the analytic computing entity 20 generates a new drug date range based on the days' supply of the drug associated with the new claim, as indicated at step/operation 614.

As an example, if an individual receives a 30-day supply of a mediation, and on day 31 the member receives a refill for another 30-day supply for that same mediation, the patient has had no gap in active medication availability. However many individuals refill the prescription before the supply is completely exhausted, and therefore for these overlapping refills, the analytic computing entity 20 extends out the appropriate number of medication days based on the amount received with the refill.

However, patient drug therapy is often a dynamic process wherein drug strengths and dosing frequency adjustments are often necessary to produce optimal responses. The analytic computing entity 20 is accordingly able to accommodate drug formulation and/or administration changes when the drug entity and/or route of administration remains consistent.

Moreover, the analytic computing entity 20 is configured to allow for short gaps in medication treatment, which may arise from patient delays in receiving a medication refill. The length of allowable gap for combining subsequent prescriptions may be user defined, however a default value may be provided with the system. As an example, a default allowable gap may be set to 10-days. This 10-day gap accounts for possible administration changes due to intelligent nonadherence by the member, general nonadherence by the member, or occasional stockpiling of drugs by the member. So long as a member refills a prescription within the defined allowable gap period, the analytic computing entity 20 does not identify the gap as indicative of a discontinuance of the medication regimen.

By modifying date ranges associated with various claims to reflect prescription refills while accommodating prescription overlaps, small gaps between prescription refills, changes to prescriptions that do not result in an effective increase in complexity to the patient, and/or the like, the analytic computing entity 20 is configured to distinguish between changes in a member's prescriptions that result in a net change in the member's prescription complexity from changes to the member's prescriptions that maintain a stable level of complexity to the patient.

To avoid double counting particular prescriptions while maintaining appropriate associations between related prescription claims records, the system may be configured to combine multiple prescription claims records and/or to generate new prescription claims records to form merged data records that are utilized to replace prescription claims records received by the analytic computing entity 20, wherein the new prescription claims records reflect the time-series duration (e.g., date range) associated with the merged data records of the new prescription claims. The merged or new claims records are reflective of the total date range associated with the prescription, as determined based at least in part on modified calculations of a days' supply, dosage frequency, and/or the like.

The analytic computing entity 20 may be configured to repeat the process for receiving claim data, determining claim eligibility, and determining claim characteristics including non-temporal aspects and/or other characteristics (as reflected at steps/operations 402-404 of FIG. 4) for all claims for a particular member. The analytic computing entity 20 may then begin construction of claim data structures for the member to provide a view of the member's prescription complexity as a function of time. The claim data structure for a particular member comprises collections of data nodes reflective of the prescriptions associated with a member during continuous periods of time during which no changes to those prescriptions occurred (time periods defined between consecutive prescription events). Accordingly, the analytic computing entity 20 is configured to review the various claims data records and corresponding claims characteristics (which collectively may be temporarily stored in a cache memory location to facilitate construction of the claim data structure for the member) to identify data indicating when one or more prescriptions changed for the member. This data may be reflected as an initial start date for a prescription, an end date for the prescription, dates at which the prescription was substantively modified (e.g., the number of units per dosage changed, the number of dosages per day changed, and/or the like), and/or the like.

Because the analytic computing entity 20 methodology for determining claim characteristics comprises steps/operations for combining associated claims to avoid double counting of particular prescriptions and/or to avoid flagging simple prescription refills as substantive changes to the member's prescription complexity, the analytic computing entity 20 identifies such substantive changes to the member's prescription complexity as dates on which a particular prescription claim began or ended, as reflected in the claims characteristics determined by the analytic computing entity 20. In certain embodiments, substantive changes to a prescription are reflected as separated claims records (e.g., a first claims record ending on a first day and reflective of a prior prescription characteristic and a second claims record beginning on the day after the first day and reflective of a current prescription characteristic, wherein both the first and second claims records may be associated with the same underlying drug).

As indicated at step/operation 405, the system creates a member node within a member-specific claim data structure (e.g., identifying the member) that comprises data indicative of determined changes in prescription data for the member. The claim data structure comprises a plurality of time frame nodes each being reflective of a continuous date range during which the member's prescriptions remained unchanged between consecutive prescription events (such as beginning a new prescription, ending a prescription, and/or the like), and accordingly each date range is bookended by dates on which at least one prescription changed for the member. Consecutive prescription events are not limited to events occurring with respect to a single prescription. For example, consecutive prescription events may be defined as a first prescription starting on a first day and a second prescription starting on a second day some time after the first day, so long as no other events occurred therebetween. As yet another example, consecutive prescription events may be defined as a first prescription ending on a first day and a second prescription ending on a second day some time after the first day. As yet another example, consecutive prescription events may be defined as a first prescription ending on a first day and a second prescription beginning on a second day some time after the first day. Consecutive prescription events may also relate to a single prescription (e.g., the prescription starting on a first day and ending on a subsequent second day, so long as no other prescription events occur between the first and second day).

As a specific example, if a particular member is prescribed 3 drugs on Jan. 1, 2018, and the date on which there was a change in the member's prescriptions was Feb. 22, 2018, on which 1 of the 3 prescribed drugs was discontinued (as determined based on an ending date for the discontinued prescription), the analytic computing entity 20 generates a time frame node in the data structure corresponding to the particular member (e.g., having a member node identifying the member) for the date range Jan. 1, 2018 to Feb. 22, 2018. If the next prescription-related event occurs on Mar. 3, 2018, on which the dosing frequency for a second of the original 3 prescribed drugs changes (as determined based on an ending date for a claim associated with the second drug's initial dosing frequency and an immediately subsequent start date for a claim associated with the new dosing frequency for the second drug), the analytic computing entity 20 generates a second time frame node for the date range of Feb. 23, 2018 to Mar. 3, 2018. As reflected in the foregoing example, the analytic computing entity 20 of various embodiments may be configured to avoid having overlapping date ranges with associated time frame nodes. However, the system may be configured to enable gaps in date ranges associated with various time frame nodes. Continuing the previous example, if all of the remaining prescriptions ended for the member on Mar. 25, 2018, the system generates a third time frame node for the date range of Mar. 4, 2018 to Mar. 25, 2018. If the member then subsequently begins a fourth prescription on Apr. 22, 2018 (with no intervening prescriptions) that ends on May 4, 2018, the analytic computing entity 20 may be configured to generate a fourth time frame node for the date range of Apr. 22, 2018 to May 4, 2018, but the analytic computing entity 20 does not generate a time frame node for the time frame of Mar. 26, 2018 to Apr. 21, 2018—the date range during which the member did not have any prescriptions.

As indicated at step/operation 406 of FIG. 4, the analytic computing entity 20 is configured to associate each of the generated time frame nodes with one or more drug nodes and/or drug therapy nodes. In particular, drug nodes of certain embodiments are each reflective of a specific drug prescribed to the member during the date range corresponding to the particular time frame node (as discussed herein, in certain embodiments, drug nodes may additionally be associated with drug therapy nodes indicative of a particular drug therapy to which the particular drugs relate, and those drug therapy nodes are associated with corresponding time frame nodes as discussed herein). These drug nodes each correspond to a particular drug that was associated with the member during one or more date ranges associated with corresponding time frame nodes, and accordingly a particular drug node may be associated with a plurality of time frame nodes (e.g., in instances in which a drug prescription spans multiple date ranges). For example, a member's prescription for Drug A may remain unchanged for several years, while the same member's prescriptions for Drug B, Drug C, and Drug D may change one or more times during the same multi-year period of the Drug A prescription. Because each change in prescriptions associated with Drug B, Drug C, and Drug D may result in the creation of a new time frame node, a drug node associated with the relatively constant Drug A prescription may be associated with the time frame nodes for each of the multiple time periods reflected in the member's data structure.

To associate these drug nodes with relevant time frame nodes, the analytic computing entity 20 may compare data indicative of date ranges associated with each of the generated time frame nodes against the start and end dates stored within stored data indicative of the individual claims characteristics. Upon identifying date ranges within individual claim characteristics that overlap with the dates associated with a particular time frame node, the analytic computing entity 20 associates a drug node for the particular drug with the time frame node. This process may be repeated to associate a single drug node with a plurality of time frame nodes, if applicable. The system thereby minimizes the processing resources required for building the data structure by comparing a series of a plurality of dates associated with a particular time frame node against date ranges associated the individual claims. Thus, the analytic computing entity 20 need not perform comparisons on a day-by-day basis, nor must the analytic computing entity 20 generate daily data structures for each individual member.

In certain embodiments, the data structure is generated for each member to encompass all claims data associated with the respective member. The data structures for each member may be stored in a memory storage area, such as data structure area 265. The analytic computing entity 20 may thereafter be configured to perform various complexity analyses and/or generate an output utilizing the data stored for various members. In certain embodiments, the complexity analyses may be performed for user-defined time periods, and accordingly the analytic computing entity 20 may be configured to accept user input (e.g., via a user interface display) indicative of a particular member for which an analysis is to be performed as well as a time-frame of interest to be utilized for the analysis. Thereafter, processes for calculating weighted complexity scores as discussed herein are performed for claims occurring and/or overlapping with the time-frame of interest. In other embodiments, the process for calculating weighted complexity scores as discussed herein may be performed for all time periods associated with the particular member, and the user's input of a particular date range of interest may restrict (e.g., filter) the data to be output for the user, such that only data associated with the user's selection of a particular time frame is output for the user.

Moreover, as indicated at steps/operations 407, the analytic computing entity 20 may be configured to associate individual claims with therapyIDs indicative of a particular condition and/or drug therapy plan applicable to the member. Such therapyIDs enable later comparisons of the relative complexity of particular combinations of prescriptions associated with the member that collectively are prescribed for a particular purpose (e.g., to treat a particular condition, as a multi-drug therapy plan for a particular condition, and/or the like). As discussed herein, drug characteristics may provide maps to corresponding therapyIDs, such that the analytic computing entity 20 may identify therapyIDs applicable to each member during particular time periods (time periods reflective by particular time frame nodes). Moreover, the analytic computing entity 20 may identify drugs having matching therapyIDs, such that those drugs may be mapped to the same drug therapy node within the data structure. The data structure may thereby comprise a single member node identifying the member for which the data structure is constructed (if applicable), time frame nodes reflective of particular date ranges, drug therapy nodes reflective of particular therapyIDs, and drug nodes reflective of particular drugs, wherein drug nodes may be associated with one or more drug therapy node (therapyID node) and one or more time frame nodes, and each drug therapy node may be reflected with one or more time frame nodes (date range. In certain embodiments, a particular drug therapy node may be associated with only one drug node, or the drug therapy node may be associated with a plurality of drug nodes. The total number of drug nodes associated with a particular drug therapy node may be determined based at least in part on the number of drugs prescribed to a particular member that share a common therapyID within the drug characteristics.

In certain embodiments, the analytic computing entity 20 is further configured to identify and characterize orphan claim data (e.g., those claims data records comprising a positive orphan status indicator) as indicated at block 408. While orphan claims are not utilized during complexity calculations, those orphan claim records may be associated with particular member nodes (thereby associating the drug with a particular member), time frame nodes (thereby associating the drug with a particular time period) and/or drug therapy nodes (thereby associating the drug with a particular drug therapy), based at least in part on data stored within corresponding claims records that is indicative of particular date ranges associated with the claim and/or therapyIDs mapped to the particular drug identified within the claim record. By including orphan data within the data structure for a particular member, the analytic computing entity 20 may be configured to provide data within generated output reports indicative of the presence of orphan data (e.g., identifying particular drugs prescribed to a member but excluded from the complexity calculation) such that system users may interpret the generated complexity score for a particular time frame with a view of the presence of various orphan data applicable to the same timeframe.

As indicated at steps/operations 409-410 of FIG. 4, the analytic computing entity 20 is further configured to determine weighted characteristics for the each time frame node (encompassing all drugs prescribed for the member for a particular date range) and the therapyID specific drug therapy nodes (encompassing drugs prescribed for a particular drug therapy for the member) for each time frame node (time frame). Processes performed by the analytic computing entity 20 for calculating the weighted characteristics for both the summary of time frame nodes and therapyID specific drug therapy nodes are reflected at FIG. 7. Accordingly, complexities attributable to all drugs prescribed to a member during a particular time period may be reflected by a complexity score calculated for the time frame node, while complexities attributable to only those drugs associated with a particular therapyID may be utilized to determine a complexity score for a particular therapyID-specific drug therapy node. In other words, complexities attributable to a particular drug may be utilized for determining a member's overall drug complexity score and may be utilized for determining a particular drug therapy's complexity score. In certain embodiments, a particular drug may be associated with only one drug therapy, such that the drug's complexities does not impact more than one drug therapy node's calculated complexity score.

As shown beginning at step/operation 701, the process for determining weighted characteristics of a particular portion of a data structure (e.g., all claims associated with a particular time frame node (e.g., time frame) for determining a summary weighting or all claims associated with a particular drug therapy node (e.g., therapyID) for determining a weighting for a particular drug therapy begins with generating a listing of unique drug identifiers in the particular data collection for which weighting is to be determined. As indicated at steps/operations 702-704, the process continues by collecting relevant data for which weighting scores are determined for each drug identified within the data collection. Specifically, frequency weights, RoaDF weights, auxiliary label weights, and multiplier weights are determined for each drug (as indicated at steps/operations 702-704, respectively). In certain embodiments, additional weighting characteristics may be retrieved and reviewed as well, and it should be understood that the weighting characteristics discussed herein may be merely exemplary for certain embodiments.

With respect to each of the frequency weights, RoaDF weights, and/or multiplier weights, the analytic computing entity 20 may be configured to reference one or more data stores comprising mapping data for mapping individual frequency characteristics, RoaDF characteristics, multiplier characteristics, and/or the like with particular weighting scores. These weighting scores may be stored on a drug-specific basis or on a drug-agnostic basis. In the latter embodiments, a single, defined weighting score may be assigned for any drug having particular characteristics. As a non-limiting example, a drug-agnostic, frequency weighted score of 4 may be assigned to any drug that requires dosages to be taken more than 4 times per day.

Specifically with reference to step/operation 702, frequency weight scores may be mapped to various defined frequency levels commonly utilized with drug applications. For example, defined frequency intervals may each be associated with a defined weighting value. As specific examples "take once per day" may be associated with a weight value of 1; "take twice per day" may be associated with a weight value of 2; "take 6 times per day" may be associated with a weight value of 5; and/or the like. Moreover, prescriptions in which a defined frequency is based on the member, such as "take as needed" may be assigned a weight value of 1. Upon determining the applicable weight score for a particular claim, the weight score may be stored in a cache for later reference. The weight scores may be provided on a fixed scale having a maximum and a minimum weighting score (e.g., a scale from 1-5), and accordingly all frequency values considered by the analytic computing entity 20 may have a weighted score along the defined scale between the maximum and minimum value. In certain embodiments, the scale may be identical for each of the plurality of attributes contributing to an overall complexity score (e.g., each of frequency, RoaDF, auxiliary label instructions, multiplier weights, and/or the like), however in certain embodiments the scale may be different for one or more of the attributes.

Figure 7:
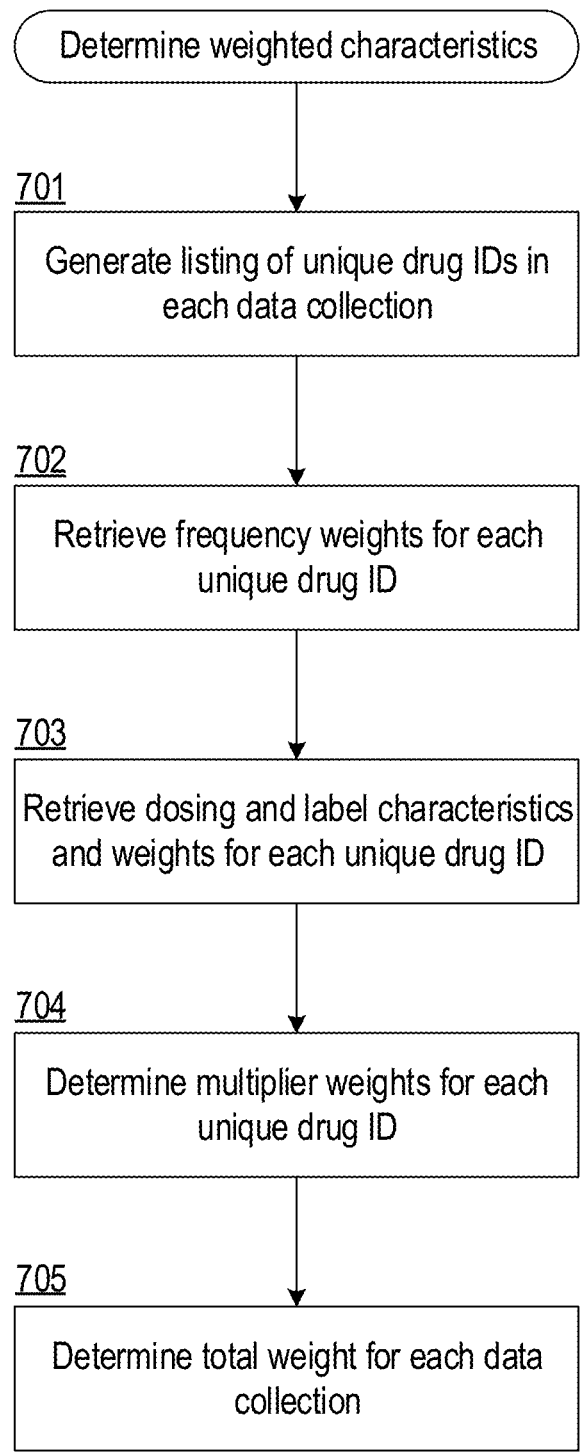
FIG. 7 is a flowchart illustrating steps/operations for determining weight characteristics for claims according to various embodiments; data

With reference to step/operation 703 of FIG. 7, the analytic computing entity 20 retrieves weighting scores for the RoaDF characteristics and auxiliary label characteristics associated with a claim. As discussed herein, the RoaDF characteristics and various aspects of the auxiliary label characteristics are mapped to respective weighting scores (e.g., within respective data stores accessible to the analytic computing entity 20). Again, upon determining a particular weight score for the RoaDF characteristics and auxiliary label characteristics of a claim, the scores may be stored in a cache for later reference.

Finally, the analytic computing entity 20 determines applicable weight scores based on the multiplier characteristics associated with a particular claim. For example, the analytic computing entity 20 accesses a data store mapping various multiplier values with corresponding weight score values. Once the weight score values are retrieved for the multiplier characteristics as indicated at step/operation 704, the weight score values are stored in a cache for later reference.

As indicated at step/operation 705, the system sums the weight scores for various claims considered within the data collection to generate a weighted complexity score for the particular data collection. Because such processes are performed both for a summary of claims taken by a member as well as for claims associated with a particular drug therapy, the system calculates an overall complexity score for a particular date range (and associated time frame node), as indicated at step/operation 409 of FIG. 4, and calculates a complexity score for each individual drug therapy area (and associated drug therapy node), as indicated at step/operation 410 of FIG. 4. In various embodiments, the analytic computing entity 20 is configured to generate and/or store a data file comprising the results of the complexity calculations (e.g., in a memory storage area). In certain embodiments, the output data file may be flat text file provided in a buffer memory of the analytic computing entity 20 and having enumerated lengths for each portion of the output. Data fields (e.g., such data fields being defined as having a defined number of characters within the flat data file having a defined start location (e.g., the location of the first character within the data field) and/or a defined end location (e.g., the location of the last character within the data field). An example of various data that may be included within an output file is shown in Table 4, below.

TABLE 4

| Field Name | Data Type | Start Loc. | Length | Example values |
|---|---|---|---|---|
| MemberID | AlphaNum | 1 | 32 | 123456 (with preceding or trailing zeros), alphabetic names, and/or the like |
| Age | Num | 33 | 3 | 0-999 |
| Gender | Char | 36 | 1 | M, m, F, f, or null |
| Start Date | Date | 37 | 8 | YYYYMMDD |

TABLE 4-continued

| Field Name | Data Type | Start Loc. | Length | Example values |
|---|---|---|---|---|
| End Date | Date | 45 | 8 | YYYYMMDD |
| TherapyID | Num | 53 | 4 | 0000-0099; 9999 |
| DrugID | Num | 57 | 4 | 0000-9999 |
| DrugID [alt] | Num | 61 | 4 | 0000-9999 |
| Num Multiple Wt | Num | 65 | 4 | 0000-9999 |
| Num Unique Orphan | Num | 69 | 4 | 0000-9999 |
| Total Wt | DecNum | 73 | 6 | 000.00-999.99 |
| RoaDF Wt | DecNum | 79 | 6 | 000.00-999.99 |
| Dose Freq Wt | DecNum | 85 | 6 | 000.00-999.99 |
| Aux Wt | DecNum | 91 | 6 | 000.00-999.99 |
| Mult Wt | DecNum | 97 | 6 | 000.00-999.99 |
| Reserved Wt | DecNum | 103 | 6 | 000.00 |
| Error Status | Char | 109 | 1 | 0, 1, 2, 3, 4 |
| Reserved | N/A | 110 | 8 | Null |

Although the output is discussed herein as being provided within flat data file, it should be understood that various embodiments may provide output files in any of a variety of formats. For example, the analytic computing entity 20 may be configured to generate fielded data files, such as XML-based data files, delimited data files, and/or the like.

Finally, as indicated at step/operation 411, the analytic computing entity 20 is configured to generate a graphical output to be provided to the user of the analytic computing entity 20. In various embodiments, the graphical output may be configured in accordance with FIG. 8, which provides an example output matrix according to one embodiment. The complexity output of FIG. 8 is provided for a single member (Member ID=1) and provides the member's age and gender as determined during each claim. The complexity output further comprises data indicative of various date ranges utilized to establish time frame nodes within the data. As discussed herein, the member's prescriptions remain constant within each date range, and change at edges of each date range. Within each date range, the output of FIG. 8 includes summary data (indicated by Drug TherID of 0) as well as data regarding each of a plurality of additional drug therapy. Each provided data row provides data indicative of unique drugs provided (e.g., Num GCN and Num DCC; as indicated the analytic computing entity 20 may be configured to utilize a plurality of drug identification methodologies), number of multiple unit doses, the number of orphan drugs included, and/or the like. Moreover the complexity output may additionally comprise a weighted complexity score total, as well as data indicative of individual complexity score components, including the weight attributable to RoaDF, dose frequency, auxiliary instructions, and multiplier components. The output also provides data indicative of any errors that may have occurred during processing, such as errors in retrieving a user's age, eligibility data, and/or the like.

FIG. 9 provides yet another example output that may be generated for a particular member. The example output of FIG. 9 provides an overall complexity score summary for a member on a given date, and provides additional data indicative of various complexity scores generated with respect to individual components. The output of FIG. 9 includes data indicative of the number of unique drugs prescribed to the member of the date associated with the report, as well as weighting scores attributable to individual components of the weight, including the dose frequency weight score, the multiple units/dose weight score, the RoaDF weight score, the auxiliary instructions weight score, and/or the like. Similar data is provided for each drug therapy applicable to the patient on the particular report date.

Figure 10:
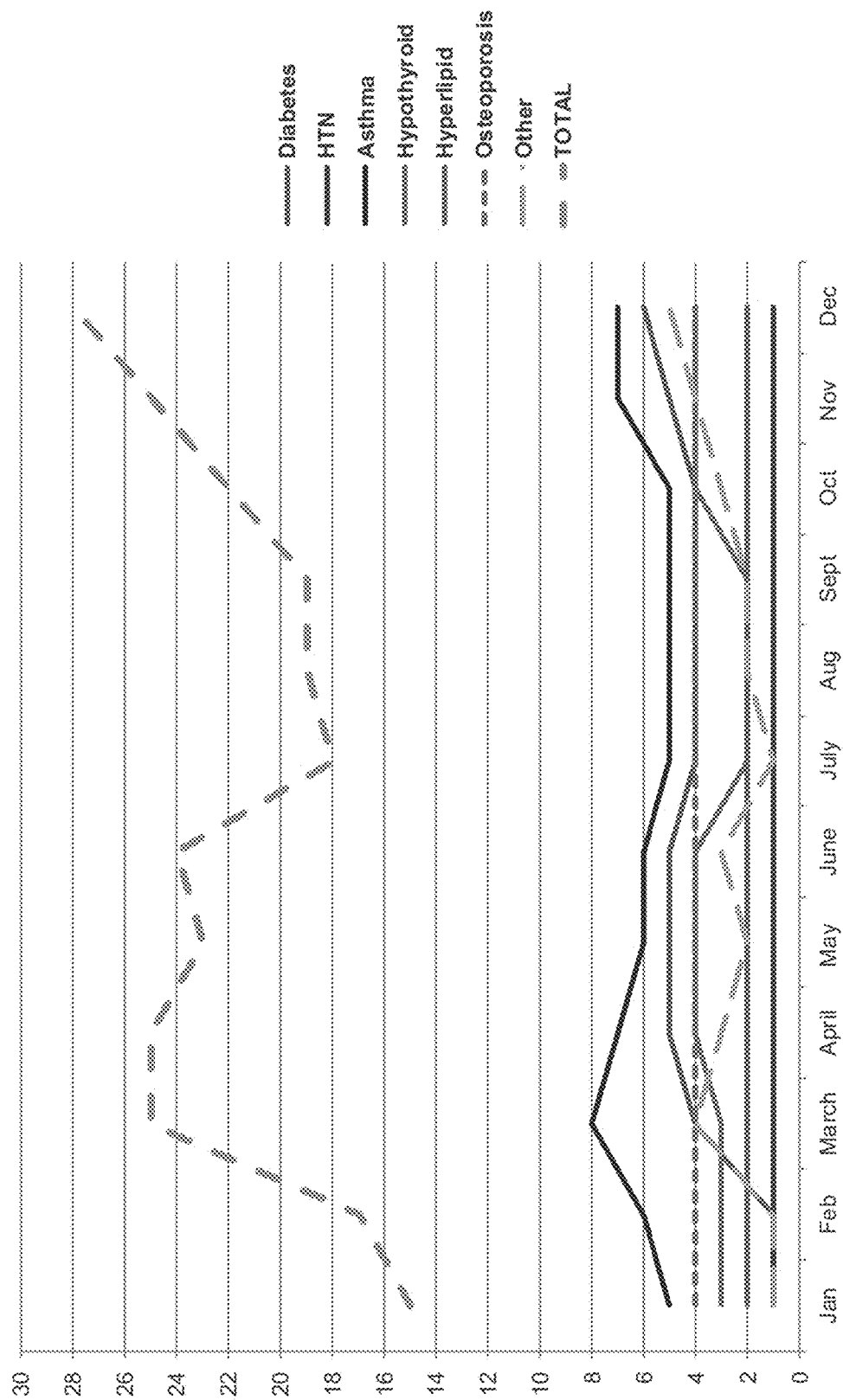

FIG. 10 provides a graphical summary chart that may be generated for a particular member and which provides a graphical depiction of the member's prescription complexity as a function of time. As shown in the graphical depiction of FIG. 10, the graphical summary provides a depiction of a total prescription complexity score over time, as well as depictions of the prescription complexity scores for individual drug therapies over time.

Figure 11:
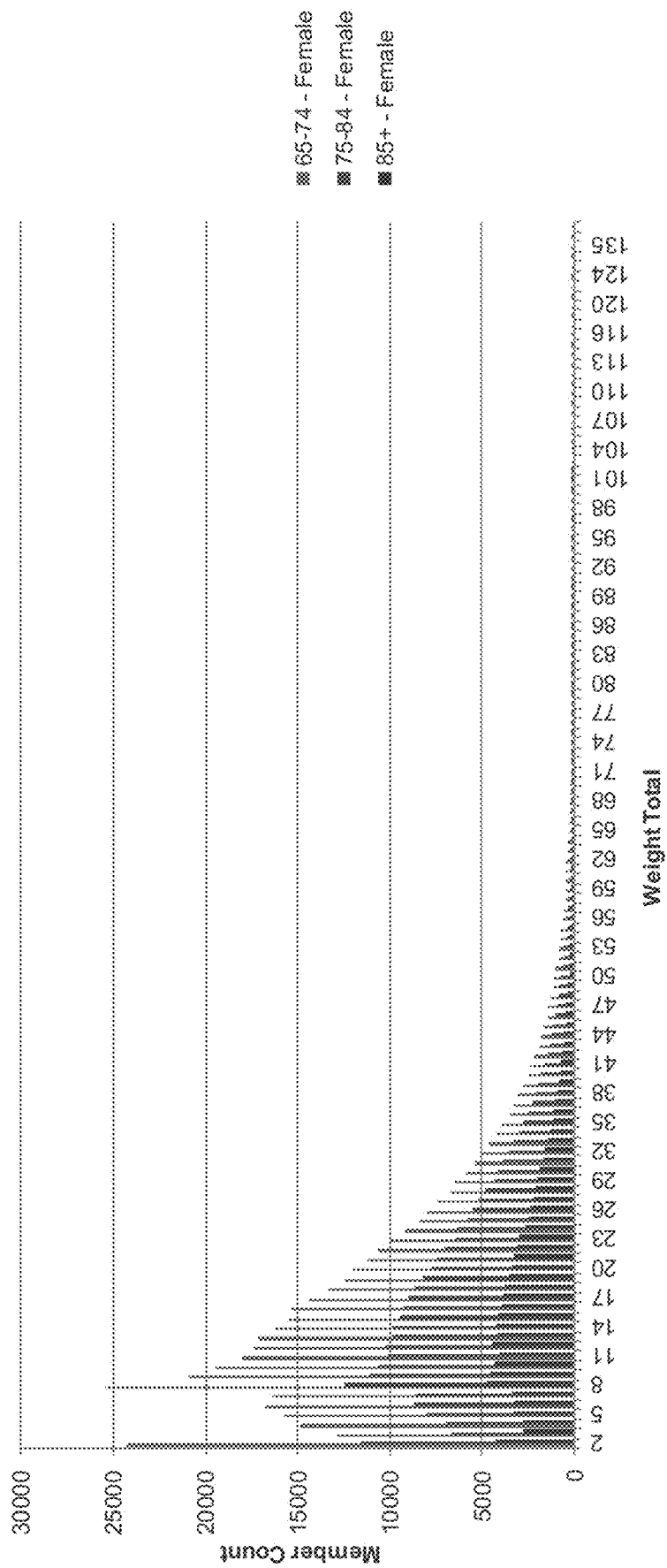
Figure 12:
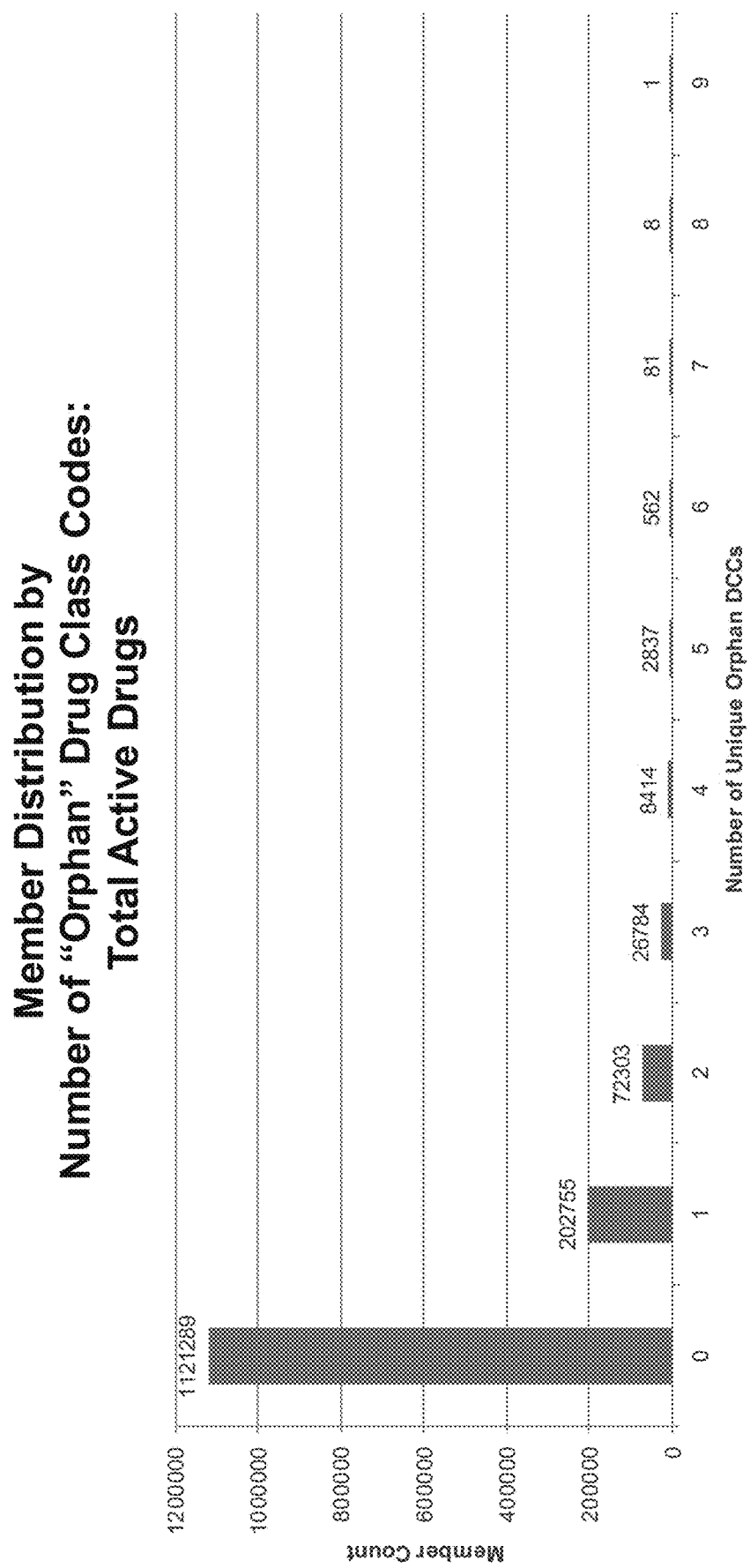

As shown in FIGS. 11-12, data for a plurality of members may be anonymized and compiled to generate summary data indicating the level of complexity of prescriptions for various populations. For example, FIG. 11 illustrates a distribution plot illustrating the number of individuals having prescription complexities at various levels. FIG. 12 provides yet other summary data that may be provided as an output of various embodiments, illustrating the number of orphan claims that may be included in various members' prescription mixes.

It should be understood that various aspects of the foregoing outputs may be provided via any of a variety of graphical output mechanisms. In various embodiments, the analytic computing entity 20 may be configured to generate and display a summary display dashboard to a user providing one or more of the information outputs discussed in reference to FIGS. 8-12. In certain embodiments, the analytic computing entity 20 may be configured to transmit various outputs to user computing entities for display thereon.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for automatically combining time-series based data records stored within a data store, the method comprising:
   identifying a plurality of matching data records within the data store based at least in part on characteristics of each of the plurality of matching data records, wherein the matching data records are embodied as a plurality of individual data records having common identifiers shared between at least two of the plurality of individual data records, and the matching data records have differing initiation dates;
   generating a plurality of merged data records for the identified plurality of matching data records, wherein each of the plurality of merged data records comprise corresponding pluralities of matching data records;
   determining a time-series duration for each of the plurality of merged data records based at least in part on the characteristics of the corresponding plurality of matching data records by:
   determining time periods of each of the plurality of matching data records associated with a merged data record based at least in part on the characteristics and the initiation date of each of the plurality of matching data records;
   identifying a time overlap or time gap between the plurality of matching data records corresponding with the merged data record; and
   determining the time-series duration for each of the plurality of merged data records based at least in part on the time period of each of the plurality of matching data records corresponding with each of the plurality of merged data records and the time overlap or the time gap between the plurality of matching data records corresponding with each of the plurality of merged data records;
   generating a data structure comprising a plurality of time frame nodes and a plurality of drug nodes, wherein the time frame nodes are associated with time frames identified based at least in part on the time-series duration for the plurality of merged data records and one or more drug nodes are associated with each of the plurality of matching data records.

2. The computer-implemented method of claim 1, wherein the characteristics for each of the plurality of matching data records comprise frequency data indicative of a usage frequency associated with each of the plurality of matching data records; and
   wherein determining a time-series duration for merged data records further comprises:
   determining whether frequency data differs between the plurality of matching data records; and
   upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records.

3. The computer-implemented method of claim 1, further comprising steps for:
   retrieving characteristic data mapped to one or more of the characteristics of at least one of the plurality of matching data records from one or more additional data stores;
   generating a summary score for the merged data record based at least in part on the characteristic data, wherein the summary score is applicable during the time-series duration of the merged data record; and
   generating a graphical output indicative of the summary score for the merged data record.

4. The computer-implemented method of claim 3, wherein generating a summary score comprises steps for generating a flat data file comprising summary score data for the merged data record.

5. The computer-implemented method of claim 1, further comprising steps for receiving a flat input data file identifying one or more reviewed characteristics and one or more time periods for analysis, and wherein the identified matching data records satisfy the reviewed characteristics and have an associated time-series duration overlapping the time periods for analysis.

6. The computer-implemented method of claim 1, wherein identifying a plurality of matching data records comprises identifying a plurality of data records having matching drug identifiers and member identifiers.

7. The computer-implemented method of claim 6, wherein the characteristics for each of the plurality of matching data records comprises dosage frequency data indicative of a frequency for taking dosages of a given number of units of a drug associated with each of the plurality of matching data records; and wherein determining a time-series duration for the merged data record further comprises:
determining whether the dosage frequency data differs between the plurality of matching data records; and
upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records.

8. The computer-implemented method of claim 6, further comprising steps for associating a plurality of matching data records with a drug therapy; and
wherein the data structure further comprises drug therapy nodes associated with the drug therapy and one or more of the drug nodes are associated with the drug therapy nodes.

9. The computer-implemented method of claim 1, wherein generating time frame nodes comprises:
identifying a first initiation date of a first merged data record;
identifying a temporally next record event selected from a second initiation date of a second merged data record or a termination date of the first merged data record such that a time period between the first initiation date and the temporally next record event reflects merged data records having unchanging drug administrative data associated therewith;
building a first time frame node associated with a date range between the first initiation date and the temporally next record event; and
wherein drug nodes associated with the first time frame node reflect at least one merged data record overlapping the date range between the first initiation date and the temporally next record event.

10. A system for automatically combining time-series based data records stored within a data store, wherein the system comprises:
one or more memory storage areas comprising a data store; and
one or more processors collectively configured to:
identify a plurality of matching data records within the data store based at least in part on characteristics of each of the plurality of matching data records, wherein the matching data records are embodied as a plurality of individual data records having common identifiers shared between at least two of the plurality of individual data records, and the matching data records have differing initiation dates;
generate a plurality of merged data records for the identified plurality of matching data records, wherein each of the plurality of merged data records comprise corresponding pluralities of matching data records;
determine a time-series duration for each of the plurality of merged data records based at least in part on the characteristics of the corresponding plurality of matching data records by:
determining time periods of each of the plurality of matching data records associated with a merged data record based at least in part on the characteristics and the initiation date of each of the plurality of matching data records;
identifying a time overlap or time gap between the plurality of matching data records corresponding with the merged data record; and
determining the time-series duration for each of the plurality of merged data records based at least in part on the time period of each of the plurality of matching data records corresponding with each of the plurality of merged data records and the time overlap or the time gap between the plurality of matching data records corresponding with each of the plurality of merged data records;
generate a data structure comprising a plurality of time frame nodes and a plurality of drug nodes, wherein the time frame nodes are associated with time frames identified based at least in part on the time-series duration for the plurality of merged data records and one or more drug nodes are associated with at least one of the plurality of matching data records.

11. The system of claim 10, wherein the characteristics for each of the plurality of matching data records comprises frequency data indicative of a usage frequency associated with each of the plurality of matching data records; and
wherein determining a time-series duration for merged data records further comprises:
determining whether frequency data differs between the plurality of matching data records; and
upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records.

12. The system of claim 10, wherein the processors are further configured to:
retrieve characteristic data mapped to one or more of the characteristics of at least one of the plurality of matching data records from one or more additional data stores;
generate a summary score for the merged data record based at least in part on the characteristic data, wherein the summary score is applicable during the time-series duration of the merged data record; and
generate a graphical output indicative of the summary score for the merged data record.

13. The system of claim 12, wherein generating a summary score comprises steps for generating a flat data file comprising summary score data for the merged data record.

14. The system of claim 10, wherein the one or more processors are further configured to receive a flat input data file identifying one or more reviewed characteristics and one or more time periods for analysis, and wherein the identified matching data records satisfy the reviewed characteristics and have an associated time-series duration overlapping the time periods for analysis.

15. The system of claim 10, wherein identifying a plurality of matching data records comprises identifying a plurality of data records having matching drug identifiers and member identifiers.

16. The system of claim 15, wherein the characteristics for each of the plurality of matching data records comprises dosage frequency data indicative of a frequency for taking dosages of a given number of units of a drug associated with each of the plurality of matching data records; and wherein determining a time-series duration for the merged data record further comprises:
  determining whether the dosage frequency data differs between the plurality of matching data records; and
  upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records.

17. The system of claim 15, wherein the one or more processors are further configured for associating a plurality of matching data records with a drug therapy; and
  wherein the data structure further comprises drug therapy nodes associated with the drug therapy and one or more of the drug nodes are associated with the drug therapy nodes.

18. The system of claim 10, wherein generating time frame nodes comprises:
  identifying a first initiation date of a first merged data record;
  identifying a temporally next record event selected from a second initiation date of a second merged data record or a termination date of the first merged data record such that a time period between the first initiation date and the temporally next record event reflects merged data records having unchanging drug administrative data associated therewith;
  building a first time frame node associated with a date range between the first initiation date and the temporally next record event; and
  wherein drug nodes associated with the first time frame node reflect at least one merged data record overlapping the date range between the first initiation date and the temporally next record event.

19. A computer program product comprising a non-transitory computer readable medium having computer program instructions stored therein, the computer program instructions when executed by a processor, cause the processor to:
  identify a plurality of matching data records within a data store based at least in part on characteristics of each of the plurality of matching data records, wherein the matching data records are embodied as a plurality of individual data records having common identifiers shared between at least two of the plurality of individual data records, and the matching data records have differing initiation dates;
  generate a plurality of merged data records for the identified plurality of matching data records, wherein each of the plurality of merged data records comprise corresponding pluralities of matching data records;
  determine a time-series duration for each of the plurality of merged data records based at least in part on the characteristics of the corresponding plurality of matching data records by:
    determine time periods of each of the plurality of matching data records associated with a merged data record based at least in part on the characteristics and the initiation date of each of the plurality of matching data records;
    identify a time overlap or time gap between the plurality of matching data records corresponding with the merged data record; and
    determine the time-series duration for each of the plurality of merged data records based at least in part on the time period of each of the plurality of matching data records corresponding with each of the plurality of merged data records and the time overlap or the time gap between the plurality of matching data records corresponding with each of the plurality of merged data records;
  generate a data structure comprising a plurality of time frame nodes and a plurality of drug nodes, wherein the time frame nodes are associated with time frames identified based at least in part on the time-series duration for the plurality of merged data records and one or more drug nodes are associated with at least one of the plurality of matching data records.

20. The computer program product of claim 19, wherein the characteristics for each of the plurality of matching data records comprises frequency data indicative of a usage frequency associated with each of the plurality of matching data records; and
  wherein determining a time-series duration for merged data records further comprises:
    determining whether frequency data differs between the plurality of matching data records; and
    upon identifying a time overlap between the plurality of matching data records and upon determining that the frequency data differs between the plurality of matching data records, extending the time-series duration of the merged data record based at least in part on a length of the time overlap and frequency data associated with one of the plurality of matching data records.

21. The computer program product of claim 19, further configured to cause the processor to:
  retrieve characteristic data mapped to one or more of the characteristics of at least one of the plurality of matching data records from one or more additional data stores;
  generate a summary score for the merged data record based at least in part on the characteristic data, wherein the summary score is applicable during the time-series duration of the merged data record; and
  generate a graphical output indicative of the summary score for the merged data record.

22. The computer program product of claim 21, wherein generating a summary score comprises steps for generating a flat data file comprising summary score data for the merged data record.

23. The computer program product of claim 19, further configured to cause the processor to receive a flat input data file identifying one or more reviewed characteristics and one or more time periods for analysis, and wherein the identified matching data records satisfy the reviewed characteristics and have an associated time-series duration overlapping the time periods for analysis.

24. The computer program product of claim 19, wherein identifying a plurality of matching data records comprises identifying a plurality of data records having matching drug identifiers and member identifiers.

25. The computer program product of claim 24, wherein the characteristics for each of the plurality of matching data records comprises dosage frequency data indicative of a frequency for taking dosages of a given number of units of a drug associated with each of the plurality of matching data records; and
  wherein determining a time-series duration for the merged data record further comprises:

determining whether the dosage frequency data differs between the plurality of matching data records; and upon identifying an overlap between the plurality of matching data records and upon determining that the dosage frequency data differs between the plurality of matching data records, extending the time-series duration of the merged data record based at least in part on a length of the overlap and a dosage frequency associated with one of the plurality of matching data records.

26. The computer program product of claim 24, further configured to cause the processor to associate a plurality of matching data records with a drug therapy; and wherein the data structure further comprises drug therapy nodes associated with the drug therapy and one or more of the drug nodes are associated with the drug therapy nodes.

27. The computer program product of claim 19, wherein generating time frame nodes comprises:

identifying a first initiation date of a first merged data record;

identifying a temporally next record event selected from a second initiation date of a second merged data record or a termination date of the first merged data record such that a time period between the first initiation date and the temporally next record event reflects merged data records having unchanging drug administrative data associated therewith;

building a first time frame node associated with a date range between the first initiation date and the temporally next record event; and wherein drug nodes associated with the first time frame node reflect at least one merged data record overlapping the date range between the first initiation date and the temporally next record event.

* * * * *